United States Patent
Yoon et al.

(10) Patent No.: US 10,554,372 B2
(45) Date of Patent: *Feb. 4, 2020

(54) METHOD AND APPARATUS FOR TRANSMITTING AND RECEIVING CHANNEL STATE INFORMATION REFERENCE SIGNAL IN FULL DIMENSION MIMO WIRELESS COMMUNICATION SYSTEM

(71) Applicants: Technology in Ariscale, LLC, Irvine, CA (US); Ariscale Inc., Daejeon (KR)

(72) Inventors: Sung Jun Yoon, Seoul (KR); Jianjun Li, Seoul (KR)

(73) Assignees: Technology in Ariscale, LLC, Irvine, CA (US); Ariscale Inc., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,078

(22) Filed: Feb. 8, 2019

(65) Prior Publication Data

US 2019/0215131 A1   Jul. 11, 2019

Related U.S. Application Data

(63) Continuation of application No. 15/094,901, filed on Apr. 8, 2016, now Pat. No. 10,256,963.

(30) Foreign Application Priority Data

| Apr. 10, 2015 | (KR) | .......................... 10-2015-0051016 |
| Aug. 13, 2015 | (KR) | .......................... 10-2015-0114955 |
| Mar. 16, 2016 | (KR) | .......................... 10-2016-0031494 |

(51) Int. Cl.
*H04L 5/00* (2006.01)
*H04B 7/06* (2006.01)
*H04B 7/0413* (2017.01)

(52) U.S. Cl.
CPC ......... *H04L 5/0057* (2013.01); *H04B 7/0413* (2013.01); *H04B 7/0626* (2013.01)

(58) Field of Classification Search
None
See application file for complete search history.

(56) References Cited

U.S. PATENT DOCUMENTS

| 2013/0039203 | A1* | 2/2013 | Fong ...................... H04B 7/024 |
| | | | 370/252 |
| 2015/0318972 | A1* | 11/2015 | Zhang ................... H04L 5/0057 |
| | | | 370/329 |
| 2016/0242060 | A1* | 8/2016 | Kakishima ............ H04W 16/28 |
| 2017/0202014 | A1* | 7/2017 | Moon .................. H04B 7/0626 |

OTHER PUBLICATIONS

3rd Generation Partnership Project; Technical Specification Group Radio Access Network; "Evolved Universal Terrestrial Radio Access (E-UTRA); Physical Channels and Modulation," (Release 12), 3GPP TS 36.211, 2015, pp. 136.

* cited by examiner

*Primary Examiner* — Rebecca E Song

(57) ABSTRACT

A method for transmitting Channel State Information-Reference Signal (CSI-RS) by a base station includes: transmitting, to a User Equipment (UE), information indicating M CSI-RS antenna ports and resource allocation information of CSI-RS resource configured by aggregating K groups, wherein M and k are integers greater than or equal to 2, respectively; mapping CSI-RSs corresponding to the M CSI-RS antenna ports on the CSI-RS resource; and transmitting, to the UE, the mapped CSI-RSs.

13 Claims, 12 Drawing Sheets

FIG. 6

METHOD AND APPARATUS FOR TRANSMITTING AND RECEIVING CHANNEL STATE INFORMATION REFERENCE SIGNAL IN FULL DIMENSION MIMO WIRELESS COMMUNICATION SYSTEM

CROSS-REFERENCE TO RELATED APPLICATIONS

This application is a continuation of U.S. application Ser. No. 15/094,901, filed Apr. 8, 2016, which claims priority from and the benefit of Korean Patent Application Nos. 10-2015-0051016, filed on Apr. 10, 2015, 10-2015-0114955, filed on Aug. 13, 2015, and 10-2016-0031494, filed on Mar. 16, 2016, which are hereby incorporated by reference in its entirety.

BACKGROUND

1. Field

The present disclosure relates to a wireless communication system, and more particularly, to a method, an apparatus, software, or a recording medium that stores software, for transmitting or receiving a Channel State Information Reference Signal (CSI-RS) in a wireless communication system that supports Full Dimension Multi-Input Multi-Output (FD-MIMO) technology.

2. Discussion of the Background

The Multi-Input Multi-Output (MIMO) technology is to improve the efficiency of the transmission/reception of data using multiple transmission antennas and multiple reception antennas, as opposed to using a single transmission antenna and a single reception antenna. A receiving end may receive data through a single antenna path when a single antenna is used. When multiple antennas are used, the receiving end may receive data through multiple paths. Therefore, the data transmission speed and the amount of data transmitted may be improved, and coverage may be extended.

To increase the multiplex gain of an MIMO operation, an MIMO transmitting end may use Channel State Information (CSI) that is fed back from an MIMO receiving end. This may be referred to as a closed-loop (CL)-MIMO operation. The receiving end may determine a CSI by measuring a channel based on a predetermined reference signal (RS) obtained from the transmitting end. The CSI may include a rank indicator (RI), a precoding matrix index (PMI), channel quality information (CQI), and the like.

In the case where data is transmitted or received using multiple antennas, a channel state between each transmission antenna and each reception antenna is required to properly receive a signal. Therefore, a reference signal for each antenna port is needed. In the 3GPP LTE/LTE-A system, various reference signals are defined. For example, in the system according to 3GPP LTE release-8 and 9, Cell-Specific RS (CRS) that is transmitted for each subframe in a broadband, a UE-specific RS that is used for demodulating data, and the like, are defined. Also, in the system after 3GPP LTE-A release 10, a CSI-RS for measuring a channel, a DeModulation-RS (DM-RS) for demodulating data or Enhanced Physical Downlink Control Channel (EPDCCH), and the like, are additionally defined as new reference signals for supporting a maximum of 8 antenna ports in a downlink.

The existing MIMO wireless communication system has only supported 1-dimension antenna array (e.g., Uniform Linear Array (ULA) or Cross-Pole (or X-Pol)). The direction of a beam formed by the 1-dimension antenna array is specified by only an azimuth angle direction (e.g., a horizontal domain), and is not specified by an elevation angle direction (e.g., a vertical domain) and thus, only 2-dimension beamforming is supported.

Recently, for the purpose of improving the performance of the system, a wireless communication system that supports a 2-dimension antenna array has been developed. The wireless communication system is referred to as a Full Dimension MIMO (FD-MIMO) wireless communication system. However, a CSI-RS that supports the configuration of an antenna, which takes into consideration the FD-MIMO, has not yet defined.

Therefore, there is a desire for a method of designing a CSI-RS that supports the configuration of an antenna that takes into consideration the FD-MIMO.

SUMMARY

Exemplary embodiments disclose a method, an apparatus, software, or a recording medium that stores software, for transmitting or receiving a Channel State Information Reference Signal (CSI-RS) in a wireless communication system that supports Full Dimension Multi-Input Multi-Output (FD-MIMO) technology.

An exemplary embodiment provides a method for transmitting Channel State Information-Reference Signal (CSI-RS) by a base station, the method including: transmitting, to a User Equipment (UE), information indicating M CSI-RS antenna ports and resource allocation information of CSI-RS resource configured by aggregating K groups, wherein M and K are integers greater than or equal to 2, respectively; mapping CSI-RSs corresponding to the M CSI-RS antenna ports on the CSI-RS resource; and transmitting, to the UE, the mapped CSI-RSs.

An exemplary embodiment provides a method for transmitting Channel State Information (CSI) by a User Equipment (UE), the method including: receiving, from a base station, information indicating M CSI-Reference Signal (RS) antenna ports and resource allocation information of CSI-RS resource configured by aggregating K groups, wherein M and K are integers greater than or equal to 2, respectively; receiving, from the base station, CSI-RSs corresponding to the M CSI-RS antenna ports mapped on the CSI-RS resource; and transmitting, to the base station, the CSI generated based on the CSI-RS.

An exemplary embodiment provides a base station to transmit Channel State Information-Reference Signal (CSI-RS), the base station including: a processor; and a transceiver, wherein the processor includes: a CSI-RS configuration information determining unit to generate information indicating M CSI-RS antenna ports and resource allocation information of CSI-RS resource configured by aggregating K groups, wherein M and K are integers greater than or equal to 2, respectively; and a CSI-RS resource mapping unit to map CSI-RSs corresponding to the M CSI-RS antenna ports on the CSI-RS resource, wherein the processor is configured to transmit, to the UE, the mapped CSI-RSs using the transceiver.

An exemplary embodiment provides a User Equipment (UE) to transmit Channel State Information (CSI), the UE including: a processor; and a transceiver, wherein the processor includes: a CSI-Reference Signal (RS) configuration information determining unit to determine, based on a signaling from a base station, information indicating M CSI-Reference Signal (RS) antenna ports and resource allocation information of CSI-RS resource configured by aggregating K groups, wherein M and K are integers greater than or equal to 2, respectively; and a CSI-RS processing unit to process CSI-RSs corresponding to the M CSI-RS antenna ports on the CSI-RS resource; and a CSI report transmitting unit to transmit, to the base station, the CSI generated based on the CSI-RSs.

BRIEF DESCRIPTION OF THE DRAWINGS

FIGS. 6 and 7 are diagrams illustrating resource mapping of a CSI-RS.

DETAILED DESCRIPTION OF THE ILLUSTRATED EMBODIMENTS

Figure 1:
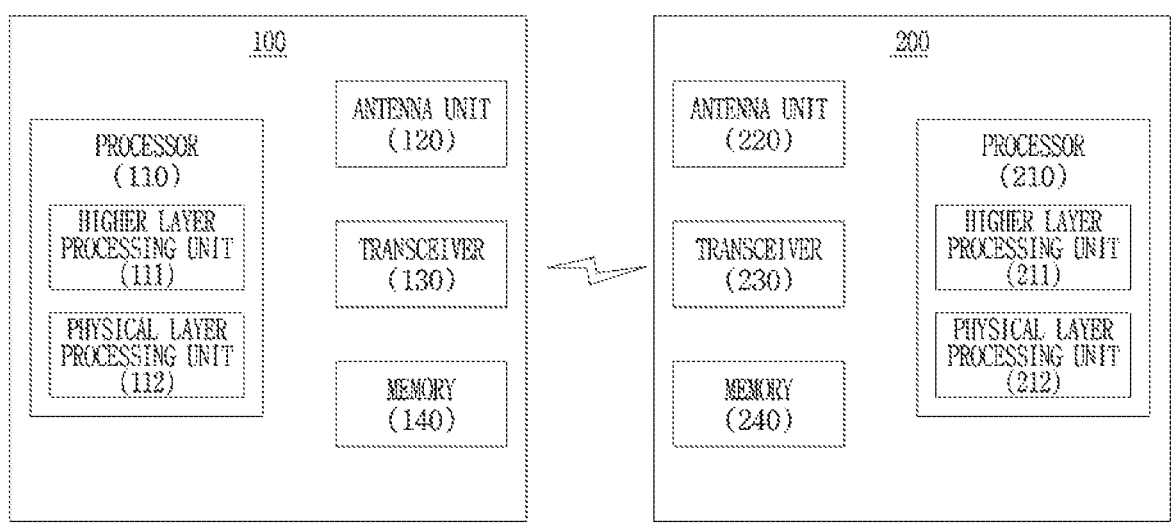
FIG. 1 is a diagram illustrating a configuration of a wireless device according to an embodiment of the present invention.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

That is, it is apparent that various operations, which are performed for the communication with a terminal in a network formed of a plurality of network nodes including a Base Station (BS), are executable by the BS or other network nodes excluding the BS. The 'BS' may be replaced with the terms, such as a fixed station, a Node B, an eNode B (eNB), an Access Point (AP), and the like. Also, the 'terminal' may be replaced with the terms, such as a User Equipment (UE), a Mobile Station (MS), a Mobile Subscriber Station (MSS), a Subscriber Station (SS), a non-AP station (non-AP STA), and the like.

The terms used for describing the embodiments of the present invention are described through the 3GPP LTE/LTE-Advanced (LTE-A) standard documents, unless otherwise noted. However, this is merely for the economic feasibility and clarity of description. It should be construed that the application of the embodiments of the present invention is not limited to the system based on the 3GPP LTE/LTE-A or following standards.

Hereinafter, a wireless device according to exemplary embodiments of the present invention will be described.

FIG. 1 is a diagram illustrating a configuration of a wireless device according to an embodiment of the present invention.

FIG. 1 illustrates a User Equipment (UE) 100 that corresponds to an example of a downlink receiving device or an uplink transmitting device, and an evolved Node B (eNB) 200 that corresponds to an example of a downlink transmitting device or an uplink receiving device.

The UE 100 may include a processor 110, an antenna unit 120, a transceiver 130, and a memory 140.

The processor 110 processes signals related to a baseband, and may include a higher layer processing unit 111 and a physical layer processing unit 112. The higher layer processing unit 111 may process the operations of a Medium Access Control (MAC) layer, a Radio Resource Control (RRC) layer, or a higher layer that is higher than them. The physical layer processing unit 112 may process the operations of a physical (PHY) layer (e.g., processing an uplink transmission signal or processing a downlink reception signal). The processor 110 may control the general operations of the UE 100, in addition to processing signals related to a baseband.

The antenna unit 120 may include one or more physical antennas, and may support MIMO transmission/reception when a plurality of antennas are included. The transceiver 130 may include a Radio Frequency (RF) transmitter and an RF receiver. The memory 140 may store information processed by the processor 110, and software, an operating system (OS), applications or the like associated with the operations of the UE 100, and may include components, such as a buffer or the like.

The eNB 200 may include a processor 210, an antenna unit 220, a transceiver 230, and a memory 240.

The processor 210 processes signals related to a baseband, and may include a higher layer processing unit 211 and a physical layer processing unit 212. The higher layer processing unit 211 may process the operations of an MAC layer, an RRC layer, or a higher layer that is higher than them. The physical layer processing unit 212 may process the operations of a PHY layer (e.g., processing a downlink transmission signal or processing an uplink reception signal). The processor 210 may control the general operations of the eNB 200, in addition to processing signals related to a baseband.

The antenna unit 220 may include one or more physical antennas, and may support MIMO transmission/reception when a plurality of antennas are included. The transceiver 230 may include an RF transmitter and an RF receiver. The memory 240 may store information processed by the processor 210, and software, an OS, applications or the like associated with the operations of the eNB 200, and may include components, such as a buffer or the like.

Hereinafter, a structure of a radio frame will be described.

Figure 2:
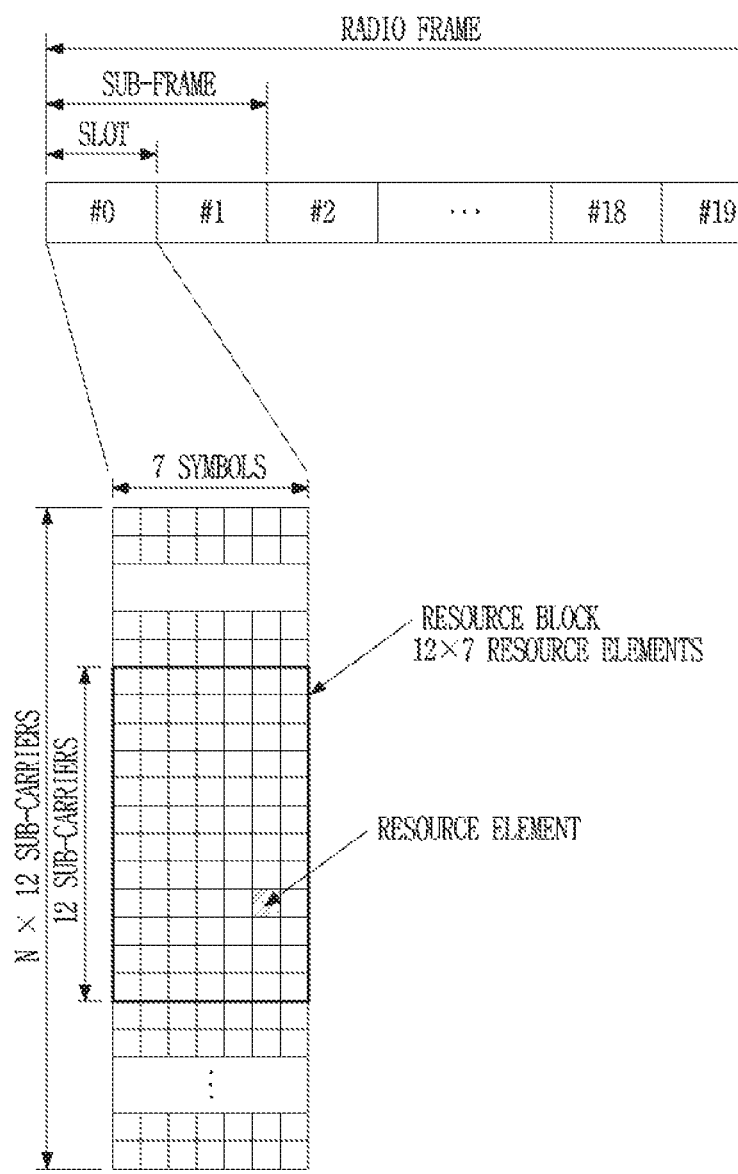
FIGS. 2 and 3 are diagrams illustrating the structure of a radio frame of the 3GPP LTE system.
Figure 3:
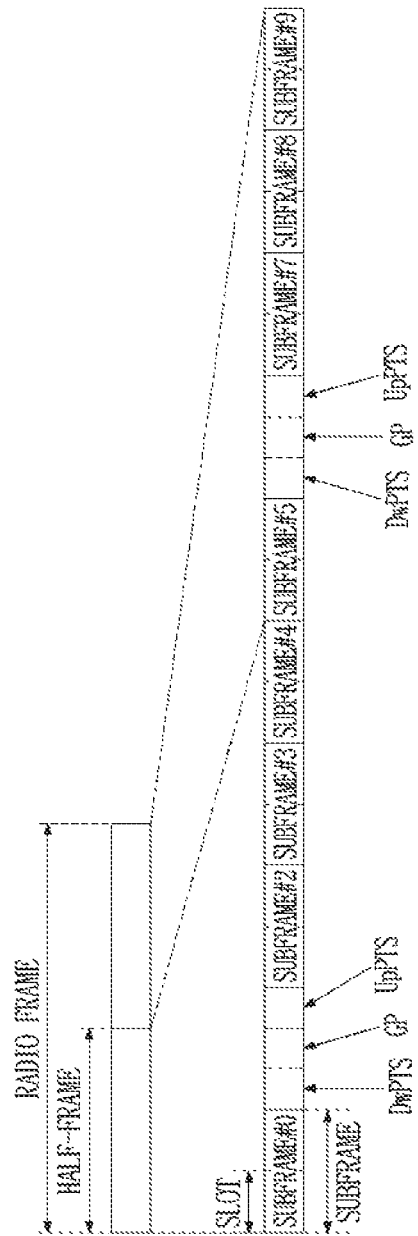

FIGS. 2 and 3 are diagrams illustrating the structure of a radio frame of the 3GPP LTE system.

In a cellular Orthogonal Frequency Division Multiplexing (OFDM) wireless packet communication system, an uplink transmission or a downlink transmission is executed based on a subframe unit. A single subframe is defined as a predetermined period of time including a plurality of OFDM symbols. The 3GPP LTE standard supports a radio frame structure type 1 that is applied to Frequency Division Duplex (FDD), and a radio frame structure type 2 that is applied to Time Division Duplex (TDD).

FIG. 2 illustrates the radio frame structure type 1. A single radio frame is formed of 10 subframes, and a single subframe is formed of 2 slots in the time domain. A time expended for transmitting a single subframe is a Transmission Time Interval (TTI). For example, the length of a single subframe is 1 ms, and the length of a single slot is 0.5 ms. A single slot may include a plurality of OFMD symbols in the time domain. The symbol may be an Orthogonal Frequency Division Multiplexing (OFDM) symbol in the downlink, or may be a Single Carrier-Frequency Division Multiple Access (SC-FDMA) symbol in the uplink, but this may not be limited thereto. Alternatively, it may be referred to as a symbol section. The number of OFDM symbols included in a single slot may be different based on a Cyclic Prefix (CP) setting. The CP may include an extended CP and a normal CP. For example, in the case of the normal CP, the number of OFDM symbols included in a single slot may be 7. In the case of the extended CP, the length of one OFDM symbol is extended and thus, the number of OFDM symbols included in a single slot may be 6, which is smaller than the normal CP. When the size of a cell is large, or when a channel state is unstable such as when a UE moves fast, or the like, an extended CP may be used to reduce inter-symbol interference.

In the resource grid of FIG. 2, a single slot corresponds to 7 OFDM symbols, in the time domain by assuming the case of an OFDM symbol of the normal CP. In the frequency domain, a system bandwidth is defined to be integer (N) times a Resource Block (RB), a downlink system bandwidth is indicated by a parameter $N^{DL}$, and an uplink system bandwidth is indicated by a parameter $N^{UL}$. A resource block is a resource allocation unit, and may correspond to a plurality of OFDM symbols (e.g., 7 OFDM symbols) of a single slot in the time domain and a plurality of consecutive sub-carriers (e.g., 12 sub-carriers) in the frequency domain. Each element in the resource grid is referred to as a Resource Element (RE). A single resource block includes 12×7 REs. The resource grid of FIG. 2 may be applied equally to an uplink slot and a downlink slot. Also, the resource grid of FIG. 2 may be equally applied to the slot of the radio frame structure type 1 and the slot of the radio frame structure type 2.

FIG. 3 illustrates the radio frame structure type 2. The radio frame structure type 2 is formed of 2 half frames, and each half frame may be formed of 5 subframes, a Downlink Pilot Time Slot (DwPTS), a Guard Period (GP), and ah Uplink Pilot Time Slot (UpPTS). Like the radio frame structure type 1, a single subframe is formed of 2 slots. The DwPTS is used for initial cell search, synchronization, or channel estimation in a UE, in addition to transmission/reception of data. The UpPTS is used for channel estimation and uplink transmission synchronization with a terminal, in an eNB. The GP is a period between an uplink and a downlink, for removing interference generated in the uplink due to a multi-path delay of a downlink signal. The DwPTS, GP, and UpPTS may be also referred to as special subframes.

Figure 4:
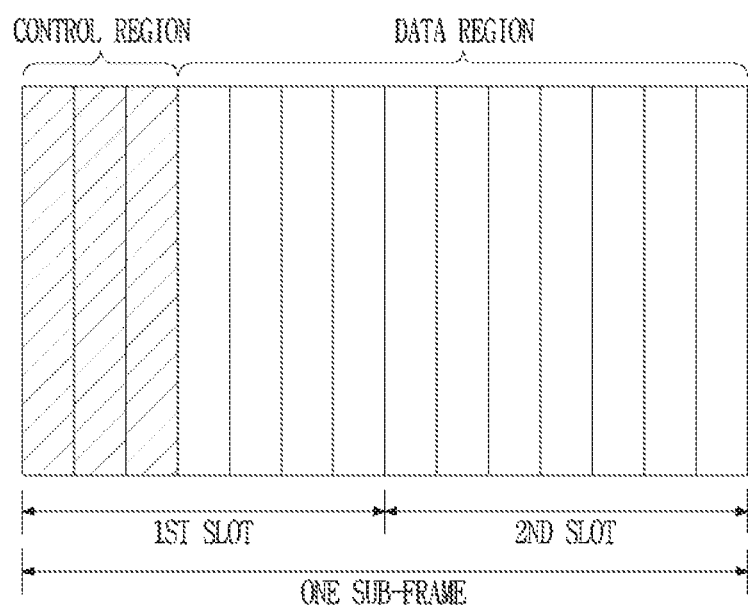
FIG. 4 is a diagram illustrating the structure of a downlink subframe.

FIG. 4 is a diagram illustrating the structure of a downlink subframe. Several OFDM symbols (e.g., 3 OFDM symbols) disposed in the front part of a first slot in a single subframe may correspond to a control region to which a control channel is allocated. The remaining OFDM symbols correspond to a data region to which a Physical Downlink Shared Channel (PDSCH) is allocated. Downlink control channels used in the 3GPP LTE system may include a Physical Control Format Indicator Channel (PCFICH), a Physical Downlink Control Channel (PDCCH), a Physical Hybrid automatic repeat request Indicator Channel (PHICH), and the like. In addition, an Enhanced Physical Downlink Control Channel (EPDCCH) may be transmitted to UEs set by an eNB, in the data region.

The PCFICH is transmitted in a first OFDM symbol of a subframe, and may include information associated with the number of OFDM symbols used in a control channel transmission in the subframe.

The PHICH is a response to an uplink transmission, and includes HARQ-ACK information.

Control information transmitted through the (E)PDCCH is referred to as Downlink Control Information (DCI). The DCI includes uplink or downlink scheduling information, or may include other control information based on various purposes, such as a command for controlling an uplink transmission power with respect to a UE group, or the like. The eNB determines an (E)PDCCH format based on a DCI transmitted to a UE, and assigns a Cyclic Redundancy Check (CRC) to control information. The CRC is masked with a Radio Network Temporary Identifier (RNTI), based on an owner or the purpose of the (E)PDCCH. When the (E)PDCCH is for a predetermined UE, the CRC may be masked with a cell-RNTI (C-RNTI) of the UE. Alternatively, when the PDCCH is for a paging message, the CRC may be masked with a Paging Indicator Identifier (P-RNTI). When the PDCCH is for a System Information Block (SIB), the CRC may be masked with a system information identifier and a system information RNTI (SI-RNTI). To indicate a random access response with respect to a random access preamble transmission of a UE, the CRC may be masked with a random access-RNTI (RA-RNTI).

Figure 5:
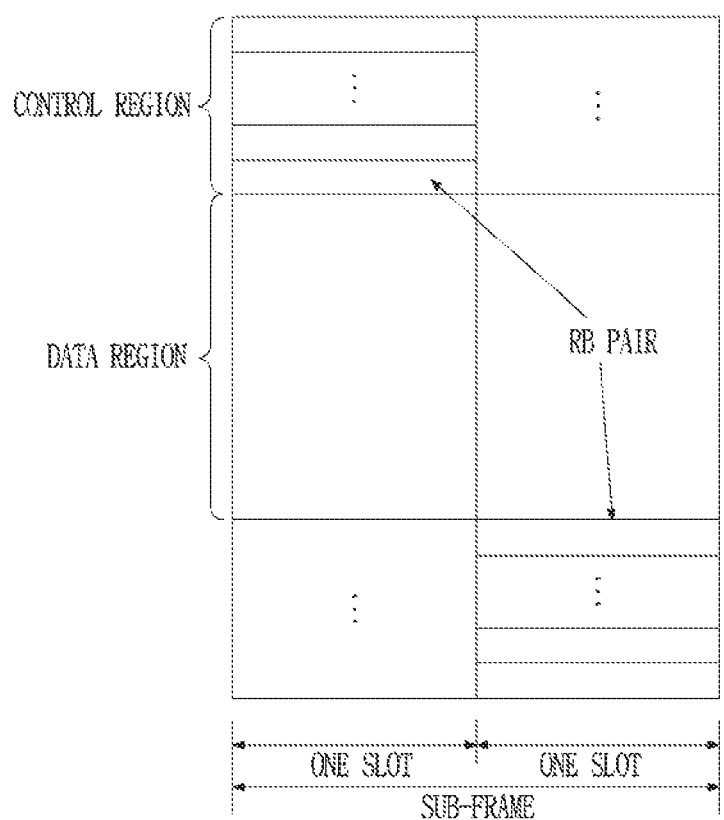
FIG. 5 is a diagram illustrating the structure of an uplink subframe.

FIG. 5 is a diagram illustrating the structure of an uplink subframe. An uplink subframe may be separated into a control region and a data region in the frequency domain. A Physical Uplink Control Channel (PUCCH) including uplink control information may be allocated to the control region. A Physical Uplink Shared Channel (PUSCH) including user data may be allocated to the data region. A PUCCH for a single UE may be allocated to a Resource Block pair (RB pair) in a subframe. The resource blocks included in the RB pair may occupy different sub-carriers in two slots. This indicates that the RB pair that is allocated to a PUCCH is frequency-hopped in a slot boundary.

Figure 6:
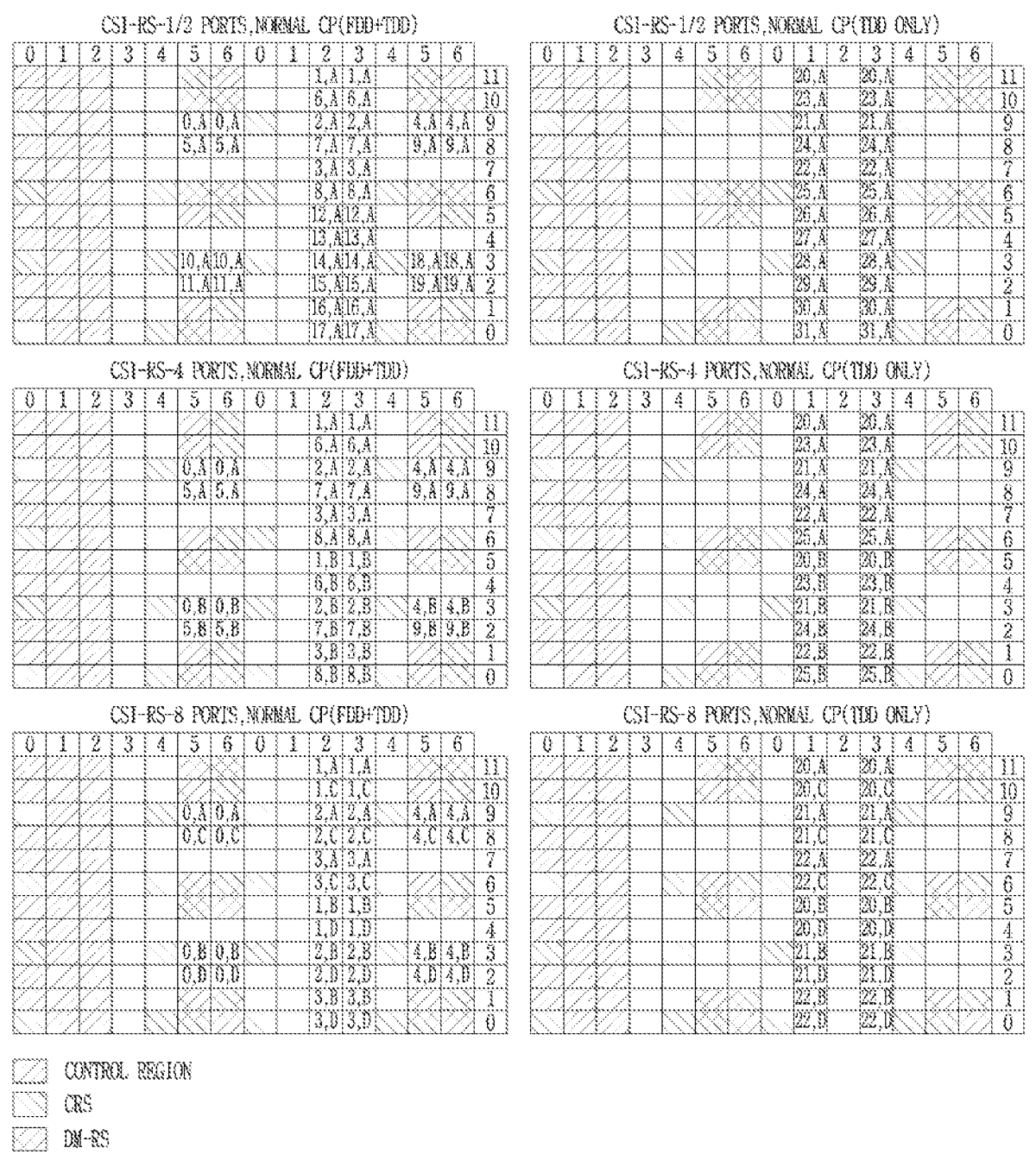
Figure 7:

FIGS. 6 and 7 are diagrams illustrating resource mapping of a CSI-RS.

FIG. 6 illustrates RS resource mapping in an RB pair in the case of a normal CP, and FIG. 7 illustrates RS resource mapping in an RB pair in the case of an extended CP. In FIGS. 6 and 7, the locations of a control region, a CRS RE, and a DM-RS RE are illustrated, in addition to the location of an RE to which a CSI-RS is mapped. Although FIGS. 6 and 7 illustrate an RE to which a CRS is mapped when 2 CRS antenna ports are used (that is, antenna port number 0 and antenna port number 1), the present invention may not be limited thereto, and the embodiments of the present invention may be equally applied to when 1 CRS antenna port (that is, antenna port number 0) or 4 CRS antenna ports (that is, antenna port numbers 0, 1, 2, and 3) are used. Also, although FIGS. 6 and 7 illustrate that the control region uses first three OFDM symbols, the present invention may not be limited thereto, and the embodiments of the present invention may be equally applied when 1, 2, or 4 OFDM symbols are used. Also, although FIGS. 6 and 7 illustrate that a DM-RS uses 2 Code Division Multiplexing (CDM) groups, the present invention may not be limited thereto, and the embodiments of the present invention may be equally applied to when 1 CDM group is used.

A sequence $r_{l,n_s}(m)$ for a CSI-RS may be generated based on Equation 1.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$
$$m = 0, 1, \ldots, N_{RB}^{max,DL} - 1$$

In Equation 1, $n_s$ denotes a slot number in a radio frame, and l denotes an OFDM symbol number in the corresponding slot. $N_{RB}^{max,DL}$ denotes the maximum number of RBs in the downlink.

A CSI-RS sequence may be generated by configuring a real part and an imaginary part through a pseudo random sequence, and by performing normalization that multiplies each part and $1/\sqrt{2}$. Here, the pseudo random sequence may be configured using 31-Gold Sequence and c(i). c(i) is a binary pseudo random sequence, and may have a value of 0 or 1. Therefore, in Equation 1, 1-2-c(i) may have a value of 1 or −1, the real part uses a $2m^{th}$ sequence that corresponds to an even number, and the imaginary part uses a $2m+1^{th}$ sequence that corresponds to an odd number. Here, the pseudo random sequence c(i) may be initialized based on Equation 2, as provided below.

$$c_{init} = 2^{10} \cdot (7 \cdot (n_s+1)+l+1) \cdot (2 \cdot N_{ID}^{SCI}+1)+2 \cdot N_{ID}^{CSI}+N_{CP} \quad \text{[Equation 2]}$$

In Equation 2, $N_{ID}^{CSI}$ may have an integer in the range of 0 to 503, and may correspond to a virtual identifier for a CSI-RS that is signaled from a higher layer. When $N_{ID}^{CSI}$ is not signaled from the higher layer, the value of $N_{ID}^{CSI}$ in Equation 2 may have a value identical to $N_{ID}^{cell}$ that is a physical cell ID (PCI). $N_{CP}$ may have a value of 1 when the normal CP is used, and may have a value of 0 when the extended CP is used.

The CSI-RS sequence generated as described above may be mapped to an RE based on the following allocation scheme, and may be transmitted.

A CSI-RS may have a single or a plurality of CSI-RS configurations for each cell. A CSI-RS configuration may include a Non-Zero transmission Power (NZP) CSI-RS configuration that corresponds to the location of an RE through which the CSI-RS is actually transmitted to a UE of each cell (or Remote Radio Head (RRH)), or may include a Zero transmission Power (ZP) CSI-RS configuration for muting a PDSCH region corresponding to a CSI-RS transmission of an adjacent cell (or RRH).

In the NZP CSI-RS configuration, one or more configurations may be signaled to each UE of a corresponding cell. The signaling may be executed through a higher layer (e.g., RRC) signaling. The information signaled to a UE may include 2-bit information (e.g., an antennaPortsCount parameter) indicating whether the number of CSI-RS antenna ports is 1, 2, 4, or 8, and 5-bit information (e.g., a resourceConfig parameter) used for determining the location of an RE to which a CSI-RS is mapped.

The 5-bit information, which is used for determining the location of an RE to which a CSI-RS is mapped, may indicate a CSI-RS pattern (that is, the locations of CSI-RS REs) that is configured for each value indicating the number of CSI-RS antenna ports, and may be configured as provided in Tables 1 and 2 below. Table 1 applies to a normal CP, and Table 2 applies to an extended CP.

TABLE 1

| | | | Number of CSI reference signals configured | | | | | |
|---|---|---|---|---|---|---|---|---|
| | CSI reference signal | | 1 or 2 | | 4 | | 8 | |
| | configuration | | (k', l') | $n_s$ mod 2 | (k', l') | $n_s$ mod 2 | (k', l') | $n_s$ mod 2 |
| Frame structure type 1 and 2 | 0 | | (9, 5) | 0 | (9, 5) | 0 | (9, 5) | 0 |
| | 1 | | (11, 2) | 1 | (11, 2) | 1 | (11, 2) | 1 |
| | 2 | | (9, 2) | 1 | (9, 2) | 1 | (9, 2) | 1 |
| | 3 | | (7, 2) | 1 | (7, 2) | 1 | (7, 2) | 1 |
| | 4 | | (9, 5) | 1 | (9, 5) | 1 | (9, 5) | 1 |
| | 5 | | (8, 5) | 0 | (8, 5) | 0 | | |
| | 6 | | (10, 2) | 1 | (10, 2) | 1 | | |
| | 7 | | (8, 2) | 1 | (8, 2) | 1 | | |
| | 8 | | (6, 2) | 1 | (6, 2) | 1 | | |
| | 9 | | (8, 5) | 1 | (8, 5) | 1 | | |
| | 10 | | (3, 5) | 0 | | | | |
| | 11 | | (2, 5) | 0 | | | | |
| | 12 | | (5, 2) | 1 | | | | |
| | 13 | | (4, 2) | 1 | | | | |
| | 14 | | (3, 2) | 1 | | | | |
| | 15 | | (2, 2) | 1 | | | | |
| | 16 | | (1, 2) | 1 | | | | |
| | 17 | | (0, 2) | 1 | | | | |
| | 18 | | (3, 5) | 1 | | | | |
| | 19 | | (2, 5) | 1 | | | | |
| Frame structure type 2 only | 20 | | (11, 1) | 1 | (11, 1) | 1 | (11, 1) | 1 |
| | 21 | | (9, 1) | 1 | (9, 1) | 1 | (9, 1) | 1 |
| | 22 | | (7, 1) | 1 | (7, 1) | 1 | (7, 1) | 1 |
| | 23 | | (10, 1) | 1 | (10, 1) | 1 | | |
| | 24 | | (8, 1) | 1 | (8, 1) | 1 | | |
| | 25 | | (6, 1) | 1 | (6, 1) | 1 | | |
| | 26 | | (5, 1) | 1 | | | | |

TABLE 1-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

In Table 1, 32 CSI-RS patterns are defined when the number of antenna ports is 1 or 2. 16 CSI-RS patterns are defined when the number of antenna ports is 4. 8 CSI-RS patterns are defined when the number of antenna ports is 8. FIG. 6 illustrates CSI-RS patterns based on a CSI-RS configuration number and the number of CSI-RS ports in Table 1.

In Table 2, 28 CSI-RS patterns are defined when the number of antenna ports is 1 or 2. 14 CSI-RS patterns are defined when the number of antenna ports is 4. 7 CSI-RS patterns are defined when the number of antenna ports is 8. FIG. 7 illustrates CSI-RS patterns based on a CSI-RS configuration number and the number of CSI-RS ports in Table 2.

The number (0, 1, 2, . . . and 31) included in each RE in FIGS. 6 and 7 indicates a CSI-RS configuration number, and an English letter (a, b, c, and d) indicates a CSI-RS antenna port number. Particularly, a indicates that a corresponding RE is used for a CSI-RS transmission through CSI-RS antenna port numbers {15, 16}. b indicates that a corresponding RE is used for a CSI-RS transmission through CSI-RS antenna port numbers {17, 18}. c indicate that a corresponding RE is used for a CSI-RS transmission through CSI-RS antenna port numbers {19, 20}. d indicates that a corresponding RE is used for a CSI-RS transmission through CSI-RS antenna port numbers {21, 22}. A CSI-RS that is transmitted through 2 antenna ports which use an identical RE location, may be multiplexed using an OCC-based CDM scheme, and may be distinguished from each other.

Also, the ZP CSI-RS configuration may be configured as 16-bit bitmap information when the number of CSI-RS antenna ports is 4. For example, when the number of CSI-RS antenna ports is 4 in Table 1 or 2, each of the CSI-RS configurations may correspond to one bit of a 16-bit bitmap. Each bit value (that is, 0 or 1) of the bitmap may be signaled in a corresponding RE by distinguishing the case in which a ZP CSI-RS is transmitted by muting a PDSCH corresponding to a CSI-RS transmission of an adjacent cell or transmission/reception point, and the case in which a ZP CSI-RS is transmitted without muting the PDSCH.

Based on (k', l') determined based on the number of antenna ports and a CSI-RS configuration number, and the value of $n_s$ mod 2 (0 or 1) (i.e., whether a slot index is an even number or an odd number), an RE to which a CSI-RS is mapped may be determined by Equation 3 as provided below.

$$a_{k,l}^{(p)} = w_{l''} \cdot r_{l,n_s}(m') \text{ where}$$

$$k = k' + 12m +$$

$$\begin{cases} -0 & \text{for } p \in \{15,16\}, \text{ normal cyclic prefix} \\ -6 & \text{for } p \in \{17,18\}, \text{ normal cyclic prefix} \\ -1 & \text{for } p \in \{19,20\}, \text{ normal cyclic prefix} \\ -7 & \text{for } p \in \{21,22\}, \text{ normal cyclic prefix} \\ -0 & \text{for } p \in \{15,16\}, \text{ extended cyclic prefix} \\ -3 & \text{for } p \in \{17,18\}, \text{ extended cyclic prefix} \\ -6 & \text{for } p \in \{19,20\}, \text{ extended cyclic prefix} \\ -9 & \text{for } p \in \{21,22\}, \text{ extended cyclic prefix} \end{cases}$$

[Equation 3]

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15,17,19,21\} \\ (-1)^{l''} & p \in \{16,18,20,22\} \end{cases}$$

$$l'' = 0,1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 3, $a_{k,l}^{(p)}$ denotes a complex-valued symbol that is mapped to an antenna port index p, a subcarrier index k, and an OFDM symbol index l, and may be defined in the form of a product of a CSI-RS sequence $r_{l,n_s}(m')$ and an OCC $w_{l''}$.

Table 1 and table 2 show 5-bit information associated with a CSI-RS pattern that may be configurable for each value corresponding to the number of CSI-RS antenna ports in the normal CP and the extended CP, respectively. k', l' indicated by the number of antenna ports and a CSI-RS configuration number in Table 1 and Table 2, indicates a predetermined RE location of a CSI-RS pattern, and the remaining RE location(s) of the corresponding CSI-RS pattern may be calculated based on Equation 3. Accordingly, all of the RE locations forming the corresponding CSI-RS pattern may be determined.

For example, it is assumed that a parameter associated with the number of CSI-RS antenna ports is 8, and 5-bit information indicating a CSI-RS configuration number has a value of '00010' (that is, 2), in the case of the normal CP. In this instance, it is determined that (k', l')=(9, 2) and $n_s$ mod 2=1 in Table 1. That is, one of the RE locations to which a CSI-RS is mapped may correspond to a subcarrier index of 9 on an OFDM symbol index of 2 in a slot having an odd numbered index. When this is applied to Equation 3, it is determined that 8 REs, expressed as 2a, 2b, 2c, and 2d of FIG. 6, are used for a CSI-RS transmission.

Also, a higher layer (e.g., RRC) signaling parameter associated with a CSI-RS may include an antennaPortsCount parameter, a resourceConfig parameter, a subframeConfig parameter, a Pc parameter, a $N_{ID}^{CSI}$ parameter, and the like.

The antennaPortsCount parameter is defined to have a size of 2 bits, and may indicate the number of antenna ports used for a CSI-RS transmission, which corresponds to each column in Table 1 or Table 2.

The resourceConfig parameter is defined to have a size of 5 bits, and may indicate a resource used for a CSI-RS transmission (that is, an RE of a CSI-RS pattern), which corresponds to each row in Table 1 or Table 2.

The subframeConfig parameter is defined to have a size of 8 bits, and may indicate a subframe used for a CSI-RS transmission, as illustrated in Table 3. The subframeConfig parameter is defined as a combination of a CSI-RS transmission period $T_{CSI-RS}$ and an offset $\Delta_{CSI-RS}$.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

The Pc parameter is a parameter indicating a value associated with a CSI-RS transmission power.

The $N_{ID}^{CSI}$ parameter may be given as a value that may replace a physical cell identifier in a Cooperative Multiple Point (CoMP) environment.

Figure 8:
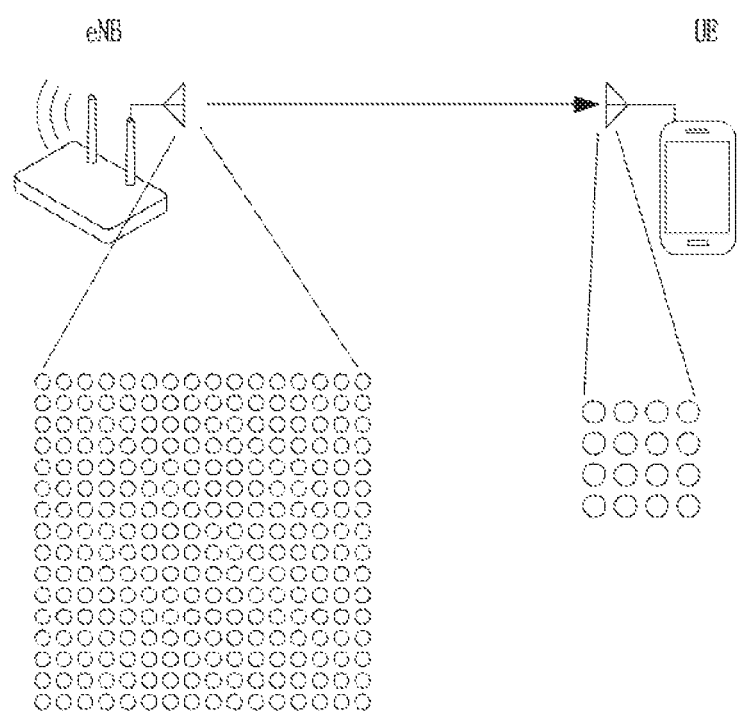
FIG. 8 is a diagram illustrating a multi-antenna system according to an embodiment of the present invention.

FIG. 8 is a diagram illustrating a multi-antenna system according to an embodiment of the present invention.

The multi-antenna system of FIG. 8 may include an eNB equipped with multiple antennas and a UE equipped with multiple antennas. The example of FIG. 8 illustrates that the eNB has a 16×16 antenna array in which 256 antenna elements are disposed, and the UE has a 4×4 antenna array in which 16 antenna elements are disposed. Here, an antenna element is a unit of distinguishing antennas from the perspective of a physical antenna, and an antenna port is a unit of distinguishing antennas from the perspective of a virtual antenna. The virtual antenna may be mapped one-to-one to a physical antenna. However, when multiple physical antennas are grouped for transmitting and receiving an identical signal, the antennas look as if they operate as a single antenna, and it may be expressed that the multiple physical antennas may form a single virtual antenna. As described above, a mapping scheme associated with a physical antenna (or an antenna element) and a virtual antenna (or an antenna port) may be different depending on an embodying scheme. Therefore, the operations of a communication system are generally defined based on a virtual transmission antenna (that is, a transmission antenna port) and a virtual reception antenna (that is, a reception antenna port). The virtualization of antennas may be understood as adjusting a channel (that is, a valid channel) between a virtual transmission antenna and a virtual reception antenna to provide better performance in the communication.

Unlike the conventional art that only supports an 1-dimension antenna array which supports 1, 2, 4, or 8 antenna ports, the eNB may be equipped with a 2-dimension antenna array that supports more than 8 antenna ports, in addition to 1, 2, 4, and 8 antenna ports. The more than 8 antenna ports supported by the eNB may be, for example, 16, 32, 64, 128, 256, . . . , or more antenna ports. For example, although 8 antenna ports of the conventional art may be configured as a 1-dimension antenna array in the form of 8×1, 16 antenna ports may be configured as a 2-dimension antenna array in the form of 8×2 or 4×4, 32 antenna ports may be configured as a 2-dimension antenna array in the form of 8×4 or 4×8, and 64 antenna ports may be configured as a 2-dimension antenna array in the form of 8×8.

Figure 9:
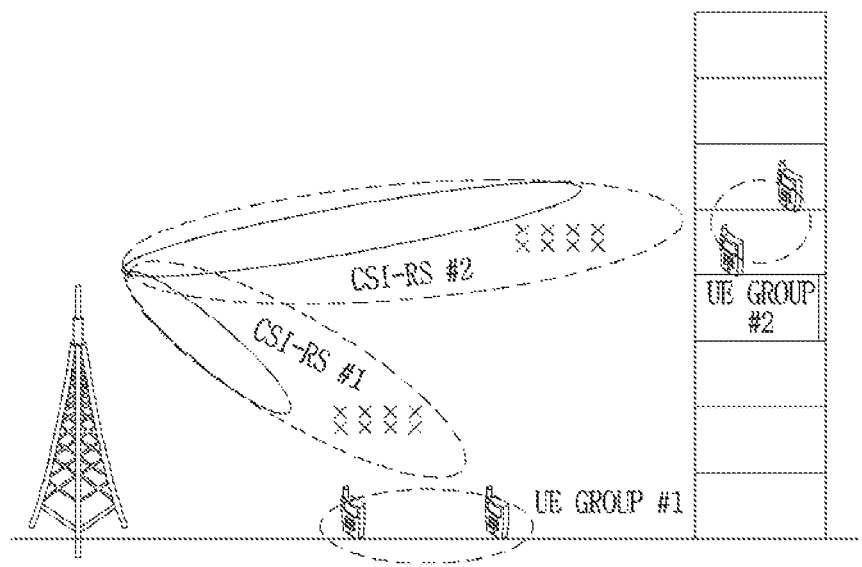
FIG. 9 is a diagram illustrating an FD MIMO transmission scheme according to an embodiment of the present invention.

FIG. 9 is a diagram illustrating an FD MIMO transmission scheme according to an embodiment of the present invention.

A transmitting end equipped with a 2-dimension antenna array may perform an FD MIMO transmission, for example, 3-dimension beamforming. That is, the beamforming of the conventional MIMO transmission is capable of executing merely the 2-dimension beamforming, which is capable of adjusting the direction of a beam to a predetermined azimuth angle direction but is incapable of adjusting the direction of a beam to an elevation angle direction (that is, a beam is formed in full direction in the elevation angle). However, when an active antenna array (AAS) using a 2-dimension antenna array is used, 3-dimension beamforming is possible, which is capable of adjusting the direction of a beam to a predetermined azimuth angle and a predetermined elevation angle direction.

The example of FIG. 9 distinguishes a beam heading toward the location of a UE group #1 and a beam heading toward the location of a UE group #2. For example, although the UE group #1 and the UE group #2 are located in the same direction from the perspective of the azimuth angle direction, they may be located in different directions from the perspective of the elevation angle direction, and different channels may be formed with respect to the UE groups. A UE may measure the state of each of the channels and may transmit a CSI-RS so as to feed the measurement back to an eNB.

For FD-MIMO, there is a desire for a method of supporting the number of CSI-RS antenna ports that is not supported by the conventional art (e.g., 3GPP LTE-A release-12). For example, the conventional art may support an NZP CSI-RS resource that has 1, 2, 4, or 8 antenna ports, and may support a plurality of NZP CSI-RS resources with respect to a CSI process having 1, 2, 4, or 8 antenna ports (here, one CSI process is associated with a CSI-RS resource for measuring a channel and a CSI-interference measurement resource (CSI-IM resource)). However, a method of supporting a new value corresponding to the number of antenna ports (e.g., 6, 12, 16, 32, 64, . . . , or more CSI-RS antenna ports) per CSI-RS resource or per CSI process, has not yet been prepared.

Hereinafter, examples of the present invention in association with a CSI-RS that supports a new value corresponding to the number of antenna ports, will be described. According to embodiments of the present disclosure, the setting (e.g., resource allocation or the like) associated with a CSI-RS transmission may be efficiently signaled based on the number of CSI-RS antenna ports that is variously required for the FD-MIMO.

Various embodiments of the present invention include a method of defining one or more out of 6, 12, 16, 32, 64, . . . , and more CSI-RS antenna ports, in addition to 1, 2, 4, or 8 CSI-RS antenna ports. For example, the configuration of the number of CSI-RS antenna ports that is greater than 8 may be defined, in addition to the configuration of the number of CSI-RS antenna ports, that is, 1, 2, 4, or 8 CSI-RS antenna ports. For example, 12 CSI-RS antenna ports and a resource allocation method thereof or the like may be additionally defined, and 16 CSI-RS antenna ports and a resource allocation method thereof or the like may be additionally defined.

Figure 10:
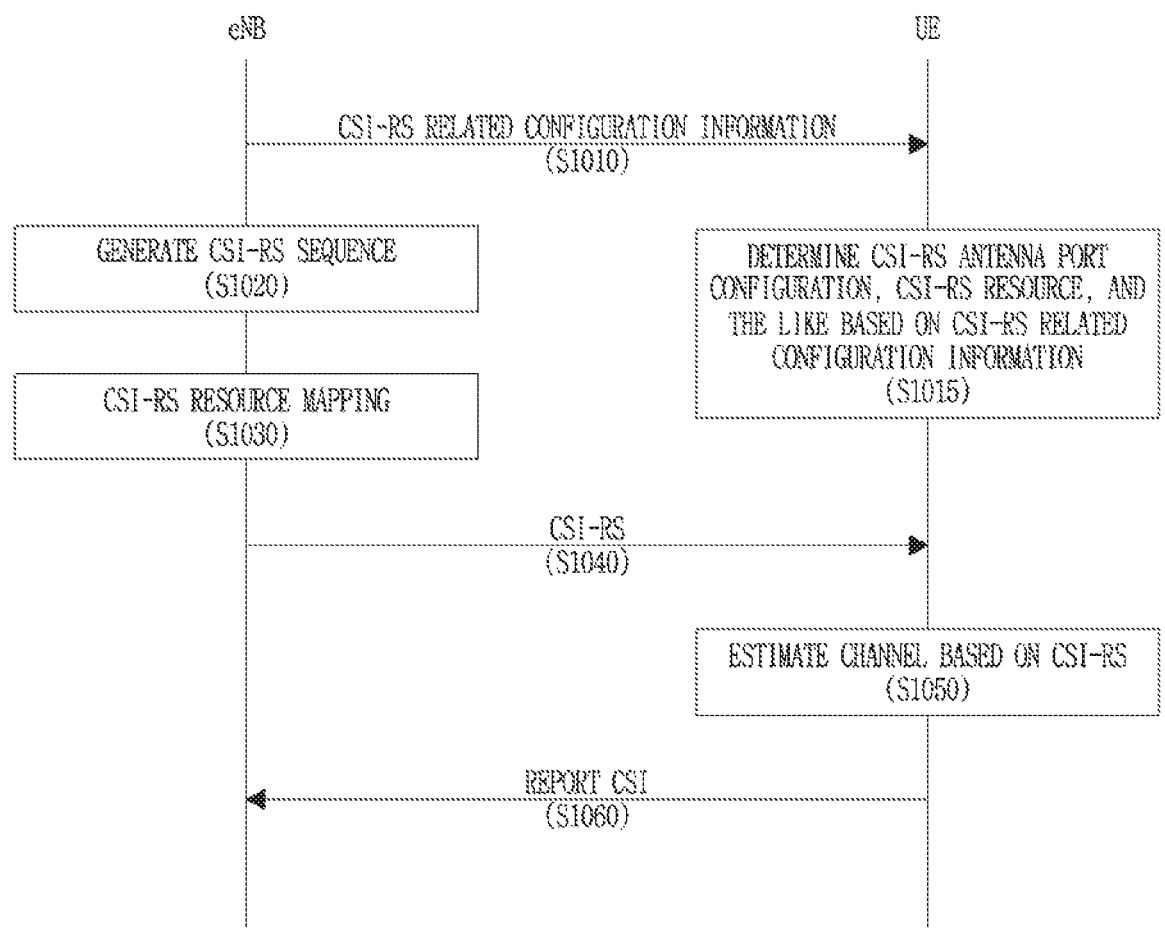
FIG. 10 is a diagram illustrating CSI-RS related operations to support FD-MIMO according to an embodiment of the present invention.

FIG. 10 is a diagram illustrating CSI-RS related operations to support FD-MIMO according to an embodiment of the present invention.

In operation S1010, an eNB transmits CSI-RS related configuration information to a UE. The CSI-RS related configuration information may include one or more pieces of information out of information associated with the number of CSI-RS antenna ports and CSI-RS resource allocation information. This corresponds to configuration information for a CSI-RS (e.g., a CSI-RS using more than 8 antenna ports) that supports a new antenna structure which takes into consideration the FD-MIMO, unlike the information associated with the CSI-RS antenna ports and the CSI-RS resource allocation information of the conventional art.

The information associated with the CSI-RS antenna ports may be configured by aggregating information (e.g., the above described antennaPortsCount parameter) indicating one of {1, 2, 4, 8} and additional information, in the form that indicates a new candidate of the number of antenna ports, which supports a new antenna configuration that takes into consideration the FD-MIMO. That is, by aggregating the information indicating the number of CSI-RS antenna ports in a single group, such as the antennaPortsCount parameter, and the additional information, the total number of CSI-RS antenna ports may be indicated. The additional information may have a size of 1 bit or 2 bits, and may be referred to as information indicating the number of CSI-RS antenna port groups (e.g., K). The additional information may not be limited by the name, and may indicate information indicating the number of CSI-RS resources, information indicating the number of CSI-RS configurations, information used for determining the total number of CSI-RS antenna ports, indication information that identifies candidates of the number of CSI-RS antenna ports, and the like.

The CSI-RS resource allocation information may be signaled with respect to each of the CSI-RS antenna port groups. For example, the CSI-RS resource allocation information may be separately or independently signaled as many times as the number of CSI-RS antenna port groups (e.g., Embodiment 1-1). Alternatively, the CSI-RS resource allocation information may be signaled with respect to one of the CSI-RS antenna port groups, and a CSI-RS resource may be determined with respect to the remaining CSI-RS antenna port group(s) based on a predetermined association rule (e.g., Embodiment 1-2).

Also, the information associated with the CSI-RS antenna ports and the CSI-RS resource allocation information may be configured as separate signaling information (e.g., Embodiment 1 or Embodiment 3), or may be configured as single signaling information in the form of a bitmap (e.g., Embodiment 2 or Embodiment 3).

In addition, the CSI-RS related configuration information may include one or more out of: a CSI-RS sequence generating parameter (e.g., parameters defined in Equations 1 and 2), a CSI-RS subframe configuration (e.g., parameters defined in Table 3), and a CSI-RS transmission power parameter.

The various pieces of CSI-RS related configuration information may be provided through a higher layer (e.g., RRC) signaling, or may be provided by being included in system information. Also, the various pieces of CSI-RS related configuration information may be provided in parallel through a single signaling opportunity, or may be separately provided through different signaling opportunities.

In operation S1015, the UE determines the configuration of a CSI-RS antenna port, the location of a resource to which a CSI-RS is mapped, the location of a CSI-RS subframe, and the like, based on the CSI-RS related configuration information received from the eNB.

In operation S1020, the eNB generates a CSI-RS sequence. A value identical to the parameter provided to the UE in operation S1010 may be used as a parameter associated with generating of the CSI-RS sequence, and the CSI-RS sequence may be generated through Equations 1 and 2.

In operation S1030, the eNB maps the CSI-RS sequence to REs. The location of the RE to which the CSI-RS is mapped or the like may be determined by Equation 3 based on Tables 1, 2 or the like, by using a value identical to the parameter provided to the UE in operation S1010. Also, the subframe to which the CSI-RS is mapped may be determined based on Table 3 or the like, by using a value identical to the parameter provided to the UE in operation S1010.

The eNB transmits the CSI-RS that is mapped the a resource to the UE in operation S1040, and the UE receives the CSI-RS on the resource through which the CSI-RS is transmitted from the eNB, based on the CSI-RS related configuration information determined in operation S1015.

In operation S1050, the UE estimates a downlink channel state from the received CSI-RS.

As a result of the channel state estimation, the UE may generate a CSI (that is, calculate or determine an RI, PMI, CQI, or the like preferred by the UE).

In operation S1060, the UE reports the generated CSI to the eNB. CSI reporting from the UE to the eNB may be performed periodically or aperiodically (or event-trigger scheme).

Hereinafter, the detailed examples of the present invention in association with a method of signaling CSI-RS related configuration information will be described.

Embodiment 1

The present embodiment relates to a signaling method in association with the number of CSI-RS antenna ports and a signaling method in association with CSI-RS resource allocation.

First, the signaling method in association with the number of CSI antenna ports will be described.

According to the present embodiment, the cases of 6, 12, 16, and 32 CSI-RS antenna ports may be additionally defined as new candidates of the number of CSI-RS antenna ports that may be transmitted in a single subframe. For example, a CSI-RS may be transmitted through 12 antenna ports, and in this instance, CSI-RS antenna port indices may be 15, 16, 17, . . . 24, 25, and 26. Alternatively, a CSI-RS may be transmitted through 16 antenna ports, and in this instance, CSI-RS antenna port indices may be 15, 16, 17, . . . , 28, 29, and 30.

To indicate one of the added candidates of the number of CSI-RS antenna ports, an extra capacity of signaling information may be defined and used. For example, the number of CSI-RS antenna ports may be indicated by extending the size of a parameter that indicates the number of antenna ports or by aggregating additional bits from the perspective of a configuration of a CSI-RS.

The signaling information indicating the number of CSI-RS antenna ports has a size of 2 bits. When the value of the two-bit information is 00, 01, 10, and 11, they may respectively indicate 1, 2, 4, and 8, which are the number of CSI-RS antenna ports.

To execute a signaling in association with new information associated with the number of CSI-RS antenna ports, information of 2 bits which indicates that the number of CSI-RS antenna ports needs to be redefined as new information of 3 or more bits, or information of 3 or more bits needs to be configured by aggregating an additional bit to the information of 2 bits. The information of 3 or more bits may be used to indicate the number of CSI-RS antenna ports. The information of 3 or more bits may indicate 6, 12, 16, and 32; which are the number of CSI-RS antenna ports.

For example, when new 3-bit information is defined, and the value indicates 000, 001, 010, 011, 100, 101, 110, and 111, they may respectively indicate 1, 2, 4, 8, 6, 12, 16, and 32, which are the number of CSI-RS antenna ports.

As another example, in the case where 3-bit information is defined by aggregating the 2-bit information and additional 1 bit, when the value of the additional bit indicates 0 and the value of the 2-bit information indicates 00, 01, 10, and 11, they may respectively indicate 1, 2, 4, and 8, which are the number of CSI-RS antenna ports. When the value of the additional bit indicates 1 and the value of the 2-bit information indicates 00, 01, 10, and 11, they may respectively indicate 6, 12, 16, and 32, which are the number of CSI-RS antenna ports.

Here, in the 3-bit information that indicates the total number of antenna ports, a first bit position (that is, an additional 1 bit) indicates the number of antenna port groups, and the remaining two bits may indicate the number of antenna ports in a single group. For example, when the value of the first bit position is 0, it indicates that the number of antenna port groups (K) is 1. When the value of the first bit position is 1, it indicates that the number of antenna port groups (K) is a value greater than or equal to 2. Particularly, when the total number of antenna ports is 1, 2, 4, and 8 (that is, when the value of the first bit position is 0 in the value of the 3-bit information (000, 001, 010, and 011)), they indicate that a single antenna port group exists. When the total number of antenna ports is 6, 12, 16, and 32 (that is, when the value of the first bit position is 1 in the value of the 3-bit information (100, 101, 110, and 111)), they indicate that two or more antenna port groups exist. Also, when the total number of antenna ports is 16 (that is, when the value of 3-bit information is 110), the value of the first bit position, '1', may indicate that two antenna port groups exist, and the value of the remaining bits, '10', may indicate that 8 antenna ports are included in a single antenna port group (e.g., 8 antenna ports are included in a first group and 8 antenna ports are included in a second group).

The 2-bit information may be, for example, an antennaPortsCount parameter that is provided through an RRC signaling, and the additional 1-bit information may be a parameter given through a separate signaling. However, the present invention may not be limited thereto. Through another piece of information of 3 or more bits; or by aggregating the 2-bit information and additional information, the number of CSI-RS antenna ports may be indicated.

Hereinafter, the signaling method in association with CSI-RS resource allocation will be described.

When the number of CSI-RS antenna ports is indicated as described above, a CSI-RS resource used for a CSI-RS transmission in a single subframe may be signaled as follows.

When the number of CSI-RS antenna ports is N (N=1, 2, 4, or 8), CSI-RS resource signaling information of 5 bits may be used. The 5-bit information may indicate a CSI reference signal configuration corresponding to the number of antenna ports N, as listed in Table 1 or Table 2. Accordingly, the location of 2 (N=1 or 2), 4 (N=4), and 8 (N=8) REs may be determined as CSI-RS resources through Equation 3 using a value determined from Table 1 or 2. Here, the CSI-RS resource signaling information may be a resource-Config parameter provided through an RRC signaling, but the present invention may not be limited thereto.

When the number of CSI-RS antenna ports is M (M=6, 12, 16, or 32) or when the number of CSI-RS antenna ports (M) is greater than 8, M CSI-RS antenna ports may be classified into K groups having an identical number antenna ports.

For example, when M=16 and K=2, some M/K (that is, 16/2=8) CSI-RS antenna ports are classified as a first group, and the remaining M/K (that is, 16/2=8) CSI-RS antenna ports are classified as a second group. Here, a resource for a 16-antenna port CSI-RS may correspond to a combination of two resources for an 8-antenna port CSI-RS.

As another example, when M=32 and K=4, some M/K (that is 32/4=8) CSI-RS antenna ports are classified as a first group, some M/K (that is, 32/4=8)) CSI-RS antenna ports out of the remaining CSI-RS antenna ports are classified as a second group, some M/K (that is, 32/4=8)) CSI-RS antenna ports out of the remaining CSI-RS antenna ports are are classified as a third group, and the remaining M/K (that is, 32/4=8) CSI-RS antennas are classified as a fourth group. Here, a resource for a 32-antenna port CSI-RS may correspond to a combination of four resources for an 8-antenna port CSI.

When the number of CSI-RS antenna ports is M (M=6, 12, 16, or 32) or when the number of CSI-RS antenna ports (M) is greater than 8, M CSI-RS antenna ports may be classified into K groups, each group having a different number antenna ports from one another.

For example, when M=6 and K=2, some 4 CSI-RS antenna ports may be classified as a first group, and the remaining 2 CSI-RS antenna ports may be classified as a second group. Here, a resource for a 6-antenna port CSI-RS may correspond to a combination of a resource for a 4-antenna port CSI-RS and a resource for a 2-antenna port CSI-RS.

As another example, when M=12 and K=2, some 8 CSI-RS antenna ports may be classified as a first group, and the remaining 4 CSI-RS antenna ports may be classified as a second group. Here, a resource for a 12-antenna port CSI-RS may correspond to a combination of a resource for an 8-antenna port CSI-RS and a resource for a 4-antenna port CSI-RS.

Hereinafter, descriptions will be provided by assuming that information associated with CSI-RS resource allocation is based on the number of CSI-RS antenna ports, the present invention may not be limited thereto. The signaling method in association with the number of CSI-RS antenna ports and the signaling method in association with CSI-RS resource allocation may be applied separately or in combination.

Embodiment 1-1

According to the present embodiment, in the case of new candidates of the number of CSI-RS antenna ports (e.g., 6, 12, 16, 32, . . . ), a plurality of antenna ports are classified into a plurality of groups and a CSI-RS resource is allocated to each group, separately or independently. Accordingly, a signaling overhead of resource allocation information may be proportional to the number of groups.

For example, the location of a resource to which a CSI-RS of the antenna ports classified as a first group is mapped, may be signaled through first resource allocation information, and the location of a resource to which a CSI-RS of the antenna ports classified as a second group is mapped, may be signaled through second resource allocation information. When third and fourth groups exist, the location a CSI-RS RE may be signaled for each group through different resource allocation information. Here, as the resource allocation information for each group, CSI-RS resource signaling information of 5 bits may be used. Here, although the CSI-RS resource signaling information may be a resource-Config parameter that is provided through an RRC signaling, the present invention may not be limited thereto.

When M=6 and K=2, with respect to a first group where some 4 CSI-RS antenna ports belong, first resource allocation information (e.g., a resourceConfig#1 parameter) may indicate a CSI reference signal configuration corresponding to 4 which is the number of antenna ports, as listed in Table 1 or Table 2, and based on a value determined accordingly, a CSI-RS resource formed of 4 REs may be determined through Equation 3. With respect to a second group where the remaining 2 CSI-RS antenna ports belong, second resource allocation information (e.g., a resourceConfig#2 parameter) may indicate a CSI reference signal configuration corresponding to 2 which is the number of antenna ports, as listed in Table 2 or Table 2, and based on a value determined accordingly, a CSI-RS resource formed of 2 REs may be determined through Equation 3. In this instance, information of a total of 10 bits (that is, 5 bits X K (here, the size of CSI-RS resource allocation information with respect to a single group is 5 bits and the number of groups K is 2)) may be required to execute signaling of resource allocation associated with the first and second groups.

When M=12 and K=2, with respect to a first group where some 8 CSI-RS antenna ports belong, first resource allocation information (e.g., a resourceConfig#1 parameter) may indicate a CSI reference signal configuration corresponding to 8 which is the number of antenna ports, as listed in Table 1 or Table 2, and based on a value determined accordingly, a CSI-RS resource formed of 8 REs may be determined through Equation 3. With respect to a second group where the remaining 4 CSI-RS antenna ports belong, second resource allocation information (e.g., a resourceConfig#2 parameter) may indicate a CSI reference signal configuration corresponding to 4 which is the number of antenna ports, as listed in Table 1 or Table 2, and based on a value determined accordingly, a CSI-RS resource formed of 4 REs may be determined through Equation 3. In this instance, information of a total of 10 bits (that is, 5 bits X K (here, the size of CSI-RS resource allocation information with respect to a single group is 5 bits and the number of groups K is 2)) may be required to execute signaling of resource allocation associated with/the first and second/groups.

When M=16 and K=2, with respect to a first group where some 8 CSI-RS antenna ports belong, first resource allocation information (e.g., a resourceConfig#1 (parameter) may indicate a CSI reference signal configuration corresponding to 8 which is the number of antenna ports, as listed in Table 1 or Table 2, and based on a value determined accordingly, a CSI-RS resource formed of 8 REs may be determined through Equation 3. With respect to a second group where the remaining 8 CSI-RS antenna ports belong, second resource allocation information (e.g., a resourceConfig#2 parameter) may indicate a CSI reference signal configuration corresponding to 8 which is the number of antenna ports, as listed in Table 1 or Table 2, and based on a value determined accordingly, a CSI-RS resource formed of 8 REs may be determined through Equation 3. In this instance, information of a total of 10 bits (that is, 5 bits X K (here, the size of CSI-RS resource allocation information with respect to a single group is 5 bits and the number of groups K is 2)) may be required to execute signaling of resource allocation associated with the first and second groups.

When M=32 and K=4, with respect to a first group where some 8 CSI-RS antenna ports belong, first resource allocation information (e.g., a resourceConfig#1 parameter) may indicate a CSI reference signal configuration corresponding to 8 which is the number of antenna ports, as listed in Table 1 or Table 2, and based on a value determined accordingly, a CSI-RS resource formed of 8 REs may be determined through Equation 3. With respect to a second group where some other 8 CSI-RS antenna ports belong, second resource allocation information (e.g., a resourceConfig#2 parameter) may indicate a CSI reference signal configuration corresponding to 8 which is the number of antenna ports, as listed in Table 1 or Table 2, and based on a value determined accordingly, a CSI-RS resource formed of 8 REs may be determined through Equation 3. With respect to a third group where some other 8 CSI-RS antenna ports belong, third resource allocation information (e.g., a resourceConfig#3 parameter) may indicate a CSI reference signal configuration corresponding to 8 which is the number of antenna ports, as listed in Table 1 or Table 2, and based on a value determined accordingly, a CSI-RS resource formed of 8 REs may be determined through Equation 3. With respect to a fourth group where the remaining 8 CSI-RS antenna ports belong, fourth resource allocation information (e.g., a resourceConfig#2 parameter) may indicate a CSI reference signal configuration corresponding to 8 which is the number of antenna ports, as listed in Table 1 or Table 2, and based on a value determined accordingly, a CSI-RS resource formed of 8 REs may be determined through Equation 3. In this instance, information of a total of 20 bits (that is, 5 bits X K (here, the size of CSI-RS resource allocation information with respect to a single group is 5 bits, and the number of groups K is 4)) may be required to execute signaling of resource allocation associated with the first, second, third, and fourth groups.

Figure 11:
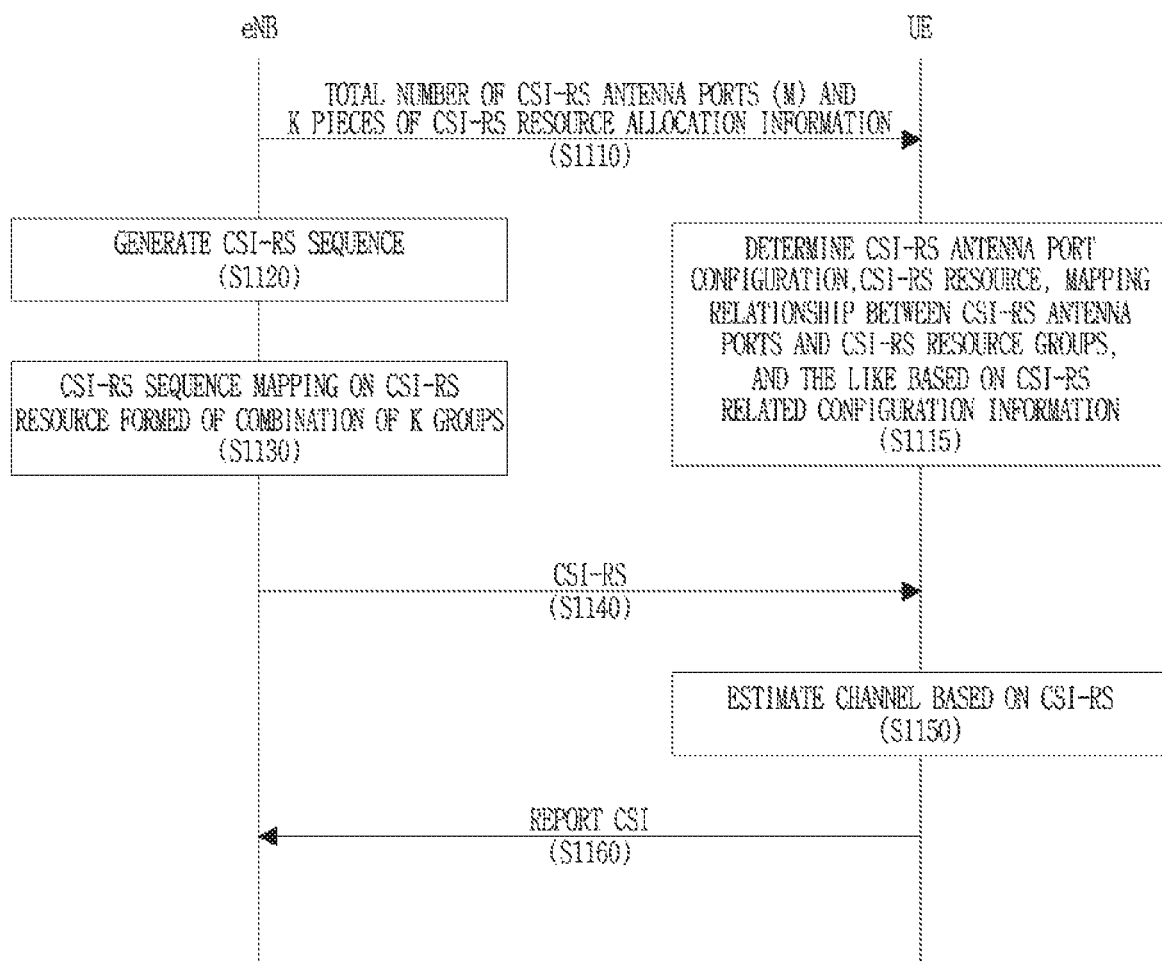
FIG. 11 is a diagram illustrating CSI-RS related operations to support FD-MIMO according to an embodiment of the present invention.

FIG. 11 is a diagram illustrating CSI-RS related operations to support FD-MIMO according to an embodiment of the present invention. Operations S1110 to S1160 correspond to the detailed example of operations S1010 to S1060 of FIG. 10, and thus, the descriptions regarded as the overlap between the operations of FIG. 10 and the operations of FIG. 11 will be omitted.

In operation S1110, an eNB may transmit, to a UE, information indicating the number of CSI-RS antenna ports (M) and K pieces of CSI-RS resource allocation information. Here, the information indicating the number of CSI-RS antenna ports and the CSI-RS resource allocation information may be provided in parallel through a single signaling opportunity, or may be separately provide through different signaling opportunities.

The total number of CSI-RS antenna ports may be expressed as M (M≥2), K pieces of CSI-RS resource allocation information may be resource allocation information associated with a CSI-RS resource that is formed of a combination of K (K≥2) groups. That is, the CSI-RS resource allocation information may include resource allocation information with respect to each of the K CSI-RS resource groups. M CSI-RS antenna ports may be classified into K antenna port groups which respectively correspond to K CSI-RS resource groups, and thus, the number of CSI-RS resource groups may correspond to the number of CSI-RS antenna port groups.

Also, the information indicating the total-number of CSI-RS antenna ports M, may be formed of a combination of the information indicating the number of CSI-RS antenna port groups (or the number of CSI-RS resource groups) K and the information P indicating the number of antenna ports included in a single CSI-RS antenna port group (or a CSI-RS resource group).

As a representative example, when the number of antenna ports P included in each CSI-RS antenna port group (or a CSI-RS resource group) is 8 (P=8) and the number of CSI-RS antenna port groups (CSI-RS resource groups) K is 2 (k=2), the total number of antenna ports M is determined as 16 (M=16).

In this instance, some 8 antenna ports out of the M CSI-RS antenna ports (M=16) may correspond to a CSI-RS resource of a first group, and the remaining 8 antenna ports may correspond to a CSI-RS resource of a second group. In this instance, the CSI-RS resource allocation information may include resource allocation information associated with the CSI-RS resource of the first group and resource allocation information associated with the CSI-RS resource of the second group. That is, K pieces of CSI-RS resource allocation information (K=2) may be included.

That is, with respect to a CSI-RS that uses more than 8 antenna ports, the total number of antenna ports M (e.g., M=16) may be obtained by combining CSI-RS resources of K groups (e.g., K=2) in a single subframe. A CSI-RS resource of each group included in the combined CSI-RS resources may correspond to P antenna ports (e.g., P=2) and one CSI-RS configuration listed in Table 1 or Table 2.

In operation S1110, CSI-RS subframe configuration information (e.g., a subframe Config parameter), transmission power information (e.g., Pc), a CSI-RS sequence generating parameter (e.g., $N_{ID}^{CSI}$), and the like may be additionally transmitted to a UE.

In operation S1115, the UE may determine the location of a resource to which a CSI-RS is mapped, a mapping relationship between a CSI-RS antenna port and a CSI-RS resource group, and the location of a CSI-RS subframe, and the like, based on CSI-RS related configuration information (particularly, information associated with the total number of CSI-RS antenna ports and information associated with K pieces of CSI-RS resource allocation information) received from the eNB.

In operation S1120, the eNB generates a CSI-RS sequence.

In operation S1130, the eNB maps, the CSI-RS sequence to a CSI-RS resource. Particularly, on the CSI-RS resource formed of a combination of K groups signaled in operation S1110, a CSI-RS sequence may be mapped to a CSI-RS resource group of a corresponding CSI-RS antenna port group. In operation S1140, the eNB transmits a CSI-RS to the UE. The UE may receive the CSI-RS based on the CSI-RS related configuration information which is determined in operation S1115.

In operation S1150, the UE estimates a channel based on the CSI-RS.

In operation S1160, the UE generates or calculates a CSI based on the channel estimation, and reports the same to the eNB.

Embodiment 1-2

According to the present embodiment, in the case of new candidates of the number of CSI-RS antenna (e.g.; 6, 12, 16, 32, . . . ), a plurality of antenna ports are divided into a plurality of groups, only the CSI-RS resource allocation information with respect to one of the plurality of groups is signaled, and CSI-RS resource allocation with respect to remaining group(s) may be automatically determined based on a predetermined association rule. That is, it may be expressed that resource allocation with respect to one of the plurality of groups is explicitly signaled, and resource allocation with respect to the remaining group(s) is implicitly signaled. Accordingly, a signaling overhead of resource allocation information may be maintained, irrespective of the number of groups.

When M=6 and K=2, with respect to a first group where some 4 CSI-RS antenna ports belong, first resource allocation information (e.g., a resourceConfig parameter) may indicate a CSI reference signal configuration corresponding to 4 which is the number of antenna ports, as listed in Table 1 or Table 2, and based on a value determined accordingly, a CSI-RS resource formed of 4 REs may be determined through Equation 3. A CSI-RS resource allocated to a second group where the remaining 2 CSI-RS antenna ports belong, may be automatically determined based on the CSI-RS resource allocated to the first group and the association rule of the following Table 4, 5, 6, 7, 8, or 9. In this instance, a total of 5-bit information may be required to signal the resource allocation of the first and the second groups.

The association rule of the following Table 4, 5, 6, 7, 8, or 9 is for illustrative purpose, and the present invention may not be limited thereto

TABLE 4

| CSI reference signal configuration for 4 AP CSI-RS (normal CP) | CSI reference signal configuration for 2 AP CSI-RS (normal CP) |
|---|---|
| configuration 0 | configuration 5 |
| configuration 1 | configuration 6 |
| configuration 2 | configuration 7 |
| configuration 3 | configuration 8 |
| configuration 4 | configuration 9 |
| configuration 5 | configuration 0 |
| configuration 6 | configuration 1 |
| configuration 7 | configuration 2 |
| configuration 8 | configuration 3 |
| configuration 9 | configuration 4 |
| configuration 20 | configuration 23 |
| configuration 21 | configuration 24 |
| configuration 22 | configuration 25 |
| configuration 23 | configuration 20 |
| configuration 24 | configuration 21 |
| configuration 25 | configuration 22 |

Table 4 shows an example of an association rule in the case of the normal CP. A CSI-RS that is transmitted in first two antenna port indices {15, 16} out of the 6 CSI-RS antenna port indices {15, 16, 17, 18, 19, 20} is mapped to the location that is shifted by −0 in the frequency axis from the 2 REs of the sub-carrier location determined by k' of Table 1, and a CSI-RS that is transmitted in subsequent two antenna port indices {17, 18} is mapped to the location that is shifted by −6 in the frequency axis from the 2 REs determined based on Table 1. They are CSI-RS resource allocation locations that are directly signaled by the resourceConfig parameter.

As described above, based on the resource location determined for the first group (e.g., 4 antenna ports {15, 16, 17, 18})), the resource location for the second group (e.g., the remaining 2 antenna ports {19, 20})) may be determined based on the association rule of Table 4. According to the example of Table 4, when the CSI-RS configuration indices for the first group are 0, 1, 2, 3, 4, 20, 21, and 22, the CSI-RS resource for the second group may be allocated to the location that is shifted by −1 in the frequency axis from the 2 REs of the sub-carrier location determined by k' of Table 1. When the CSI-RS configuration indices for the first group are 5, 6, 7, 8, 9, 23, 24, and 25, the CSI-RS resource for the second group may be allocated to the location that is shifted by +1 in the frequency axis from the 2 REs of the sub-carrier location determined by k' of Table 1.

TABLE 5

| CSI reference signal configuration for 4 AP CSI-RS (normal CP) | CSI reference signal configuration for 2 AP CSI-RS (normal CP) |
|---|---|
| configuration 0 | configuration 11 |
| configuration 1 | configuration 13 |
| configuration 2 | configuration 15 |
| configuration 3 | configuration 17 |
| configuration 4 | configuration 19 |
| configuration 5 | configuration 10 |
| configuration 6 | configuration 12 |
| configuration 7 | configuration 14 |
| configuration 8 | configuration 16 |
| configuration 9 | configuration 18 |
| configuration 20 | configuration 27 |
| configuration 21 | configuration 29 |
| configuration 22 | configuration 31 |
| configuration 23 | configuration 26 |
| configuration 24 | configuration 28 |
| configuration 25 | configuration 30 |

Table 5 shows another example of an association rule in the case of the normal CP. A CSI-RS that is transmitted in first two antenna port indices {15, 16} out of the 6 CSI-RS antenna port indices {15, 16, 17, 18, 19, 20} is mapped to the location that is shifted by −0 in the frequency axis from the 2 REs of the sub-carrier location determined by k' of Table 1, and a CSI-RS that is transmitted in subsequent two antenna port indices {17, 18} is mapped to the location that is shifted by −6 in the frequency axis from the 2 REs determined based on Table 1. They are CSI-RS resource allocation locations that are directly signaled by the resourceConfig parameter.

As described above, based on the resource location determined for the first group (e.g., 4 antenna ports {15, 16, 17, 18})), the resource location for the second group (e.g., the remaining 2 antenna ports {19, 20})) may be determined based on the association rule of Table 5. According to the example of Table 5, when the CSI-RS configuration indices for the first group are 0, 1, 2, 3, 4, 20, 21, and 22, the CSI-RS resource for the second group may be allocated to the location that is shifted by −7 in the frequency axis from the 2 REs of the sub-carrier location determined by k' of Table 1. When the CSI-RS configuration indices for the first group are 5, 6, 7, 8, 9, 23, 24, and 25, the CSI-RS resource for the second group may be allocated to the location that is shifted by −5 in the frequency axis from the 2 REs of the sub-carrier location determined by k' of Table 1.

TABLE 6

| CSI reference signal configuration for 4 AP CSI-RS (normal CP) | CSI reference signal configuration for 2 AP CSI-RS (normal CP) |
|---|---|
| configuration 0 | configuration 5 |
| configuration 1 | configuration 6 |
| configuration 2 | configuration 7 |

TABLE 6-continued

| CSI reference signal configuration for 4 AP CSI-RS (normal CP) | CSI reference signal configuration for 2 AP CSI-RS (normal CP) |
| --- | --- |
| configuration 3 | configuration 8 |
| configuration 4 | configuration 9 |
| configuration 5 | configuration 10 |
| configuration 6 | configuration 12 |
| configuration 7 | configuration 14 |
| configuration 8 | configuration 16 |
| configuration 9 | configuration 18 |
| configuration 20 | configuration 23 |
| configuration 21 | configuration 24 |
| configuration 22 | configuration 25 |
| configuration 23 | configuration 26 |
| configuration 24 | configuration 28 |
| configuration 25 | configuration 30 |

Table 6 shows-another example of an association rule in the case of the normal CP. A CSI-RS that is transmitted in first two antenna port indices {15, 16} out of the 6 CSI-RS antenna port indices {15, 16, 17, 18, 19, 20} is mapped to the location that is shifted by −0 in the frequency axis from the 2 REs of the sub-carrier location determined by k' of Table 1, and a CSI-RS that is transmitted in subsequent two antenna port indices {17,18} is mapped to the location that is shifted by −6 in the frequency axis from the 2 REs determined based on Table 1. They are CSI-RS resource allocation locations that are directly signaled by the resourceConfig parameter.

As described above, based on the resource location determined for the first group (e.g., 4 antenna ports {15, 16, 17, 18})), the resource location for the second group (e.g., the remaining 2 antenna ports {19, 20})) may be determined based on the association rule of Table 6. According to the example of Table 6, when the CSI-RS configuration indices for the first group are 0, 1, 2, 3, 4, 20, 21, and 22, the CSI-RS resource for the second group may be allocated to the location that is shifted by −1 in the frequency axis from the 2 REs of the sub-carrier location determined by k' of Table 1. When the CSI-RS configuration indices for the first group are 5, 6, 7, 8, 9, 23, 24, and 25, the CSI-RS resource for the second group may be allocated to the location that is shifted by −5 in the frequency axis from the 2 REs of the sub-carrier location determined by k' of Table 1.

TABLE 7

| CSI reference signal configuration for 4 AP CSI-RS (extended CP) | CSI reference signal configuration for 2 AP CSI-RS (extended CP) |
| --- | --- |
| configuration 0 | configuration 4 |
| configuration 1 | configuration 5 |
| configuration 2 | configuration 6 |
| configuration 3 | configuration 7 |
| configuration 4 | configuration 0 |
| configuration 5 | configuration 1 |
| configuration 6 | configuration 2 |
| configuration 7 | configuration 3 |
| configuration 16 | configuration 19 |
| configuration 17 | configuration 20 |
| configuration 18 | configuration 21 |
| configuration 19 | configuration 16 |
| configuration 20 | configuration 17 |
| configuration 21 | configuration 18 |

Table 7 shows an example of an association rule in the case of the extended CP. A CSI-RS that is transmitted in first two antenna port indices {15, 16} out of the 6 CSI-RS antenna port indices {15, 16, 17, 18, 19, 20} is mapped to the location that is shifted by −0 in the frequency axis from the 2 REs of the sub-carrier location determined by k' of Table 2, and a CSI-RS that is transmitted in subsequent two antenna port indices {17, 18} is mapped to the location that is shifted by −3 in the frequency axis from the 2 REs determined based on Table 2. They are CSI-RS resource allocation locations that are directly signaled by the resourceConfig parameter.

As described above, based on the resource location determined for the first group (e.g., 4 antenna ports {15, 16, 17, 18})), the resource location for the second group (e.g., the remaining 2 antenna ports {19, 20})) may be determined based on the association rule of Table 7. According to the example of Table 7, when the CSI-RS configuration indices for the first group are 0, 1, 2, 3, 16, 17, and 18, the CSI-RS resource for the second group may be allocated to the location that is shifted by −6 in the frequency axis from the 2 REs of the sub-carrier location determined by k' of Table 2. When the CSI-RS configuration indices for the first group are 4, 5, 6, 7, 19, 20, and 21, the CSI-RS resource for the second group may be allocated to the location that is shifted by +6 in the frequency axis from the 2 REs of the sub-carrier location determined by k' of Table 2.

TABLE 8

| CSI reference signal configuration for 4 AP CSI-RS (extended CP) | CSI reference signal configuration for 2 AP CSI-RS (extended CP) |
| --- | --- |
| configuration 0 | configuration 10 |
| configuration 1 | configuration 11 |
| configuration 2 | configuration 14 |
| configuration 3 | configuration 15 |
| configuration 4 | configuration 8 |
| configuration 5 | configuration 9 |
| configuration 6 | configuration 12 |
| configuration 7 | configuration 13 |
| configuration 16 | configuration 25 |
| configuration 17 | configuration 26 |
| configuration 18 | configuration 27 |
| configuration 19 | configuration 22 |
| configuration 20 | configuration 23 |
| configuration 21 | configuration 24 |

Table 8 shows another example of an association rule in the case of the extended CP. A CSI-RS that is transmitted in first two antenna port indices {15, 16} out of the 6 CSI-RS antenna port indices {15, 16, 17, 18, 19, 20} is mapped to the location that is shifted by −0 in the frequency axis from the 2 REs of the sub-carrier location determined by k' of Table 2, and a CSI-RS that is transmitted in subsequent two antenna port indices {17, 18} is mapped to the location that is shifted by −3 in the frequency axis from the 2 REs determined based on Table 2. They are CSI-RS resource allocation locations that are directly signaled by the resourceConfig parameter.

As described above, based on the resource location determined for the first group (e.g., 4 antenna ports {15, 16, 17, 18})), the resource location for the second group (e.g., the remaining 2 antenna ports {19, 20})) may be determined based on the association rule of Table 8. According to the example of Table 8, when the CSI-RS configuration indices for the first group are 0, 1, 2, 3, 16, 17, and 18, the CSI-RS resource for the second group may be allocated to the location that is shifted by −9 in the frequency axis from the 2 REs of the sub-carrier location determined by k' of Table 2. When the CSI-RS configuration indices for the first group are 4, 5, 6, 7, 19, 20, and 21, the CSI-RS-resource for the second group may be allocated to the location that is shifted by +3 in the frequency axis from the 2 REs of the sub-carrier location determined by k' of Table 2.

TABLE 9

| CSI reference signal configuration for 4 AP CSI-RS (extended CP) | CSI reference signal configuration for 2 AP CSI-RS (extended CP) |
|---|---|
| configuration 0 | configuration 4 |
| configuration 1 | configuration 5 |
| configuration 2 | configuration 6 |
| configuration 3 | configuration 7 |
| configuration 4 | configuration 8 |
| configuration 5 | configuration 9 |
| configuration 6 | configuration 12 |
| configuration 7 | configuration 13 |
| configuration 16 | configuration 19 |
| configuration 17 | configuration 20 |
| configuration 18 | configuration 21 |
| configuration 19 | configuration 22 |
| configuration 20 | configuration 23 |
| configuration 21 | configuration 24 |

Table 9 shows another example of an association rule in the case of the extended CP. A CSI-RS that is transmitted in first two antenna port indices {15, 16} out of the 6 CSI-RS antenna port indices {15, 16, 17, 18, 19, 20} is mapped to the location that is shifted by −0 in the frequency axis from the 2 REs of the sub-carrier location determined by k' of Table 2, and a CSI-RS that is transmitted in subsequent two antenna port indices {17, 18} is mapped to the location that is shifted by −3 in the frequency axis from the 2 REs determined based on Table 2. They are CSI-RS resource allocation locations that are directly signaled by the resourceConfig parameter.

As described above, based on the resource location determined for the first group (e.g., 4 antenna ports {15, 16, 17, 18})), the resource location for the second group (e.g., the remaining 2 antenna ports {19, 20})) may be determined based on the association rule of Table 8. According to the example of Table 8, when the CSI-RS configuration indices for the first group are 0, 1, 2, 3, 16, 17, and 18, the CSI-RS resource for the second group may be allocated to the location that is shifted by −6 in the frequency axis from the 2 REs of the sub-carrier location determined by k' of Table 2. When the CSI-RS configuration indices for the first group are 4, 5, 6, 7, 19, 20, and 21, the CSI-RS resource for the second group may be allocated to the location that is shifted by +3 in the frequency axis from the 2 REs of the sub-carrier location determined by k' of Table 2.

When M=12 and K=2, with respect to a first group where some 8 CSI-RS antenna ports belong, first resource allocation information (e.g., a resourceConfig parameter) may indicate a CSI reference signal configuration corresponding to 8 which is the number of antenna ports, as listed in Table 1 or Table 2, and based on a value determined accordingly, a CSI-RS resource formed of 8 REs may be determined through Equation 3. A CSI-RS resource allocated to a second group where the remaining 4 CSI-RS antenna ports belong, may be automatically determined based on the CSI-RS resource allocated to the first group and the association rule of the following Table 10, 11, 12, or 13. In this instance, a total of 5-bit information may be required to signal the resource allocation of the first and the second groups.

The association rule of the following Table 10, 11, 12, or 13 is for illustrative purpose, and the present invention may not be limited thereto. Tables 10 and 11 illustrate the association rule of the resource allocation of the first group and the second group, in the case of the normal CP. Tables 12 and 13 illustrate the association rule of the resource allocation of the first group and the second group, in the case of the extended CP. The association rule shown in each table may not be identical, but may be similar to the examples of Table 4 to 9. Accordingly, the association rules may be understood with reference to the descriptions associated with Table 4 to 9.

TABLE 10

| CSI reference signal configuration for 8 AP CSI-RS (normal CP) | CSI reference signal configuration for 4 AP CSI-RS (normal CP) |
|---|---|
| configuration 0 | configuration 4 |
| configuration 1 | configuration 2 |
| configuration 2 | configuration 3 |
| configuration 3 | configuration 1 |
| configuration 4 | configuration 0 |
| configuration 20 | configuration 21 |
| configuration 21 | configuration 22 |
| configuration 22 | configuration 20 |

TABLE 11

| CSI reference signal configuration for 8 AP CSI-RS (normal CP) | CSI reference signal configuration for 4 AP CSI-RS (normal CP) |
|---|---|
| configuration 0 | configuration 4 |
| configuration 1 | configuration 2 |
| configuration 2 | configuration 3 |
| configuration 3 | configuration 7 |
| configuration 4 | configuration 0 |
| configuration 20 | configuration 21 |
| configuration 21 | configuration 22 |
| configuration 22 | configuration 24 |

TABLE 12

| CSI reference signal configuration for 8 AP CSI-RS (extended CP) | CSI reference signal configuration for 4 AP CSI-RS (extended CP) |
|---|---|
| configuration 0 | configuration 1 |
| configuration 1 | configuration 0 |
| configuration 2 | configuration 3 |
| configuration 3 | configuration 2 |
| configuration 16 | configuration 17 |
| configuration 17 | configuration 18 |
| configuration 18 | configuration 16 |

TABLE 13

| CSI reference signal configuration for 8 AP CSI-RS (extended CP) | CSI reference signal configuration for 4 AP CSI-RS (extended CP) |
|---|---|
| configuration 0 | configuration 1 |
| configuration 1 | configuration 4 |
| configuration 2 | configuration 3 |
| configuration 3 | configuration 6 |
| configuration 16 | configuration 17 |
| configuration 17 | configuration 18 |
| Configuration 18 | configuration 19 |

When M=16 and K=2, with respect to a first group where some 8 CSI-RS antenna ports belong, first resource allocation information (e.g., a resourceConfig parameter) may indicate a CSI reference signal configuration corresponding to 8 which is the number of antenna ports, as listed in Table 1 or Table 2, and based on a value determined accordingly, a CSI-RS resource formed of 8 REs may be determined through Equation 3. A CSI-RS resource allocated to a second group where the remaining 8 CSI-RS antenna ports belong, may be automatically determined based on the CSI-RS resource allocated to the first group and the association rule of the following Table 14, 15, 16, or 17. In this instance, a total of 5-bit information may be required to signal the resource allocation of the first and the second groups.

The association rule of the following Table 14, 15, 16, or 17 is for illustrative purpose, and the present invention may not be limited thereto. Tables 14 and 15 illustrate the association rule of the resource allocation of the first group and the second group, in the case of the normal CP. Tables 16 and 17 illustrate the association rule of the resource allocation of the first group and the second group, in the case of the extended CP. The association rule shown in each table may not be identical, but may be similar to the examples of Table 4 to 9. Accordingly, the association rules may be understood with reference to the descriptions associated with Table 4 to 9.

TABLE 14

| CSI reference signal configuration for 8 AP CSI-RS (normal CP) | CSI reference signal configuration for 8 AP CSI-RS (normal CP) |
| --- | --- |
| configuration 0 | configuration 4 |
| configuration 1 | configuration 2 |
| configuration 2 | configuration 3 |
| configuration 3 | configuration 1 |
| configuration 4 | configuration 0 |
| configuration 20 | configuration 21 |
| configuration 21 | configuration 22 |
| configuration 22 | configuration 20 |

TABLE 15

| CSI reference signal configuration for 8 AP CSI-RS (normal CP) | CSI reference signal configuration for 4 AP CSI-RS (normal CP) |
| --- | --- |
| configuration 0 | configuration 4 |
| configuration 1 | configuration 2 |
| configuration 2 | configuration 3 |
| configuration 3 | configuration 2 |
| configuration 4 | configuration 0 |
| configuration 20 | configuration 21 |
| configuration 21 | configuration 22 |
| configuration 22 | configuration 21 |

TABLE 16

| CSI reference signal configuration for 8 AP CSI-RS (extended CP) | CSI reference signal configuration for 4 AP CSI-RS (extended CP) |
| --- | --- |
| configuration 0 | configuration 1 |
| configuration 1 | configuration 0 |
| configuration 2 | configuration 3 |
| configuration 3 | configuration 2 |
| configuration 16 | configuration 17 |
| configuration 17 | configuration 18 |
| configuration 18 | configuration 16 |

TABLE 17

| CSI reference signal configuration for 8 AP CSI-RS (extended CP) | CSI reference signal configuration for 4 AP CSI-RS (extended CP) |
| --- | --- |
| configuration 0 | configuration 1 |
| configuration 1 | configuration 0 |
| configuration 2 | configuration 3 |
| configuration 3 | configuration 2 |
| configuration 16 | configuration 17 |
| configuration 17 | configuration 18 |
| configuration 18 | configuration 17 |

When M=32 and K=4, with respect to a first group where some 8 CSI-RS antenna ports belong, first resource allocation information (e.g., a resourceConfig parameter) may indicate a CSI reference signal configuration corresponding to 8 which is the number of antenna ports, as listed in Table 1 or Table 2, and based on a value determined accordingly, a CSI-RS resource formed of 8 REs may be determined through Equation 3. A CSI-RS resource allocated to a second group, a third group, and a fourth group where the remaining 24 CSI-RS antenna ports belong, may be automatically determined based on the CSI-RS resource allocated to the first group and the association rule of the following Table 18, 19, 20, or 21. In this instance, a total of 5-bit information may be required to signal the resource allocation of the first, the second, the third, and the fourth groups.

The association rule of the following Table 18, 19, 20, or 21 is for illustrative purpose, and the present invention may not be limited thereto. Tables 18 and 19 illustrate the association rule of the resource allocation of the first group, the second group, the third group, and the fourth group, in the case of the normal CP. Tables 20 and 21 illustrate the association rule of the resource allocation of the first group, the second group, the third group, and the fourth group, in the case of the extended CP. The association rule shown in each table may not be identical, but may be similar to the examples of Table 4 to 9. Accordingly, the association rules may be understood with reference to the descriptions associated with Table 4 to 9.

TABLE 18

| CSI reference signal configuration for 8 AP CSI-RS (normal CP) | 3 CSI reference signal configurations for 8 AP CSI-RS (normal CP) |
| --- | --- |
| configuration 0 | configuration 1, 2, 3 |
| configuration 1 | configuration 0, 2, 3 |
| configuration 2 | configuration 0, 1, 3 |
| configuration 3 | configuration 0, 1, 2 |
| configuration 4 | configuration 1, 2, 3 |
| configuration 20 | configuration 0, 21, 22 |
| configuration 21 | configuration 0, 20, 22 |
| configuration 22 | configuration 0, 20, 21 |

TABLE 19

| CSI reference signal configuration for 8 AP CSI-RS (normal CP) | CSI reference signal configuration for 4 AP CSI-RS (normal CP) |
| --- | --- |
| configuration 0 | configuration 1, 2, 3 |
| configuration 1 | configuration 2, 3, 4 |
| configuration 2 | configuration 1, 3, 4 |
| configuration 3 | configuration 1, 2, 4 |
| configuration 4 | configuration 1, 2, 3 |
| configuration 20 | configuration 4, 21, 22 |
| configuration 21 | configuration 4, 20, 22 |
| configuration 22 | configuration 4, 20, 21 |

TABLE 20

| CSI reference signal configuration for 8 AP CSI-RS (extended CP) | 3 CSI reference signal configurations for 4 AP CSI-RS (extended CP) |
| --- | --- |
| configuration 0 | configuration 1, 2, 3 |
| configuration 1 | configuration 0, 2, 3 |
| configuration 2 | configuration 3, 0, 1 |
| configuration 3 | configuration 0, 1, 2 |
| configuration 16 | configuration 0, 17, 18 |
| configuration 17 | configuration 0, 16, 18 |
| configuration 18 | configuration 0, 16, 17 |

TABLE 21

| CSI reference signal configuration for 8 AP CSI-RS (extended CP) | CSI reference signal configuration for 4 AP CSI-RS (extended CP) |
|---|---|
| configuration 0 | configuration 1, 2, 3 |
| configuration 1 | configuration 0, 2, 3 |
| configuration 2 | configuration 3, 0, 1 |
| configuration 3 | configuration 0, 1, 2 |
| configuration 16 | configuration 2, 17, 18 |
| configuration 17 | configuration 2, 16, 18 |
| configuration 18 | configuration 2, 16, 17 |

Embodiment 2

The present embodiment relates to a method of defining and utilizing a new field that simultaneously indicates information associated with the number of CSI-RS antenna ports and CSI-RS resource allocation information. For example, instead of using an antennaPortsCount parameter and a resourceConfig parameter respectively for the information associated with the number of CSI-RS antenna ports and the CSI-RS resource allocation information, a new field replacing the parameters (e.g., integral configuration information for a CSI-RS for the FD-MIMO) may be defined.

Embodiment 2-1

In the present embodiment, a new field may be defined as a 32-bit bitmap. For example, it may be similar to a bitmap indicating a ZP CSI-RS Configuration, but the 32-bit bitmap of the present embodiment may be information in which the information associated with the number of CSI-RS antenna ports and the CSI-RS resource allocation information are jointly encoded. Each bit position of the 32-bit bitmap may correspond to a CSI reference signal configuration value for 2 corresponding to the number of CSI-RS antenna ports in Table 1 or Table 2. For example, in this instance, when the number of CSI-RS antenna ports is 1 or 2, one bit position out of the 32 bits may have a value of "1" and the remaining bit positions may have a value of "0".

When the number of CSI-RS antenna ports is 4, two bit positions out of the 32 bits may have a value of "1", and the remaining bit positions may have a value of "0".

When the number of CSI-RS antenna ports is 8, four bit positions of the 32 bits may have a value of "1", and the remaining bit positions may have a value of "0".

When the number of CSI-RS antenna ports is 6, 3 bit positions out of the 32 bits may have a value of "1", and the remaining bit positions may have a value of "0".

When the number of CSI-RS antenna ports is 12, 6 bit positions out of the 32 bits may have a value of "1", and the remaining bit positions may have a value of "0".

When the number of CSI-RS antenna ports is 16, 8 bit positions out of the 32 bits may have a value of "1", and the remaining bit positions may have a value of "0".

When the number of CSI-RS antenna ports is 32, 16 bit positions out of the 32 bits may have a value of "1", and the remaining bit positions may have a value of "0".

Additionally, extra 1-bit information may be required to distinguish the case when the number of CSI-RS antenna ports is an odd number and the case of an even number, in this instance, when the value of the extra 1-bit information is a first value, this indicates, the number of CSI-RS antenna ports corresponds to an odd number. In 2 REs that correspond to the last bit out of the bits having a value of 1 in the 32-bit bitmap, a CSI-RS may be transmitted through one antenna port. Alternatively, when the value of the extra 1-bit information is a second value, this may indicate that the number of CSI-RS antenna ports corresponds to an even number. Here, the first value and the second value may correspond to 1 and 0, respectively, and vice versa.

Embodiment 2-2

In the present embodiment, a new field may be defined as a 16-bit bitmap. For example, it may be similar to a bitmap indicating a ZP CSI-RS configuration, but the 16-bit bitmap of the present embodiment may be information in which the information associated with the number of CSI-RS antenna ports and the CSI-RS resource allocation information are jointly encoded. Each bit location of the 16-bit bitmap may correspond to a CSI reference signal configuration value for 4 corresponding to the number of CSI-RS antenna ports in Table 1 or Table 2.

In this instance, when the number of CSI-RS antenna ports is 1 or 2, the bit position of one of the 16 bits may have a value of "1", and the remaining bits may have a value of "0".

When the number of CSI-RS antenna ports is 4, the bit position of one of the 16 bits may have a value of "1", and the remaining bits may have a value of "0".

When the number of CSI-RS antenna ports is 8, the bit positions of two of the 16 bits may have a value of "1", and the remaining bits may have a value of "0".

When the number of CSI-RS antenna ports is 6, the bit positions of two of the 16 bits may have a value of "1", and the remaining bits may have a value of "0".

When the number of CSI-RS antenna ports is 12, the bit positions of three of the 16 bits may have a value of "1", and the remaining bits may have a value of "0".

When the number of CSI-RS antenna ports is 16, the bit positions of four of the 16 bits may have a value of "1", and the remaining bits may have a value of "0".

When the number of CSI-RS antenna ports is 32, the bit positions of eight of the 16 bits may have a value of "1", and the remaining bits may have a value of "0".

As described above, in signaling using a 16-bit bitmap, the cases when the number of CSI-RS antenna ports is 1, 2, and 4 need to be distinguished from each other. Also, the cases when the number of CSI-RS antenna ports is 6 and 8 need to be distinguished from each other. To this end, extra 2-bit information may be required.

Under the assumption that the number of CSI-RS antenna ports is P, when the value of the extra 2-bit information is 00, the number of CSI-RS antenna ports (e.g., P=4, 8, 12, 16, . . . , 32, . . . ) that satisfies P mod 4=0 may be indicated.

When the value of the extra 2-bit information is 01, the number of CSI-RS antenna ports (e.g., P=1) that satisfies P mode 4=1 may be indicated. In this instance, in only 2 REs located in a higher frequency (or a lower frequency) on the frequency axis out of the 4 REs corresponding to the last bit from among the bits having a value of 1 in the 16-bit bitmap, a CSI-RS may be transmitted through one antenna port.

When the value of the extra 2-bit information is 10, the number of CSI-RS antenna ports (e.g., P=2, 6) that satisfies P mode 4=2 may be indicated. In this instance, in only 2 REs located in a higher frequency (or a lower frequency) on the frequency axis out of the 4 REs corresponding to the last bit from among the bits having a value of 1 in the 16-bit bitmap, a CSI-RS may be transmitted through two antenna ports.

When the value of the extra 2-bit information is 11, the number of CSI-RS antenna port that satisfies P mode 4=3 may be indicated. In this instance, in 2 REs located in a higher frequency (or a lower frequency) on the frequency axis out of the 4 REs corresponding to the last bit from among the bits having a value of 1 in the 16-bit bitmap, a CSI-RS may be transmitted through one antenna port. In the remaining 2 REs out of the 4 REs, a CSI-RS may be transmitted through 2 antenna ports.

Here, the number or CSI-RS ports that satisfies P mode 4=3 may not exist, and thus, the value of the additional 2 bit information, 11, maybe reserved.

Also, the correspondence between the extra 2-bit information and three or four events associated with the number of CSI-RS antenna ports (P) that satisfies P mod 4=Q (here, Q=0, 1, 2 or 0, 1, 2, 3) may not be limited to the above examples, and the present invention may include other correspondences.

An antennaPortsCount parameter may be reused as the extra 2-bit information. For example, when the value of the antennaPortsCount parameter is 00, one CSI-RS antenna port is indicated. When the value is 01, two CSI-RS antenna ports are indicated. When the value is 10, 4 or 6 CSI-RS antenna ports are indicated. When the value is 11, 8, 12, 16, or 32 CSI-RS antenna ports are indicated.

Here, when the Value of the 2-bit information is 00, which indicates that the number of CSI-RS antenna ports is 1, a CSI-RS may be transmitted through one antenna port in only 2 REs located in a higher frequency (or a lower frequency), on the frequency axis out of the 4 REs corresponding to a bit having a value of "1" in the 16-bit bitmap.

Here, when the value of the 2-bit information is 01, which indicates that the number of CSI-RS antenna ports is 2, a CSI-RS may be transmitted through two antenna ports in only 2 REs located in a higher frequency (or a lower frequency) on the frequency axis out of the 4 REs corresponding to a bit having a value of "1" in the 16-bit bitmap.

When the value of the 2-bit information is 10, which indicates that the number of CSI-RS antenna ports is 4, a CSI-RS may be transmitted through 4 antenna ports in the 4 REs corresponding to a bit having a value of "1" in the 16-bit bitmap.

When the value of the 2-bit information is 10, which indicates that the number of CSI-RS antenna ports is 6, a CSI-RS may be transmitted through 4 antenna ports in the 4 REs corresponding to a first bit from the two bits having a value of "1" in the 16-bit bitmap, and a CSI-RS may be transmitted through two antenna ports in only 2 REs located in higher frequency (or a lower frequency) on the frequency axis from among the 4 REs corresponding to the other bit.

When the value of the 2-bit information is 11, which indicates that the number of CSI-RS antenna ports is 8, a CSI-RS may be transmitted through 8 antenna ports in the 8 REs corresponding to two bits having a value of "1" in the 16-bit bitmap.

When the value of the 2-bit information is 11, which indicates that the number of CSI-RS antenna ports is 12, a CSI-RS may be transmitted through 12 antenna ports in the 12 REs corresponding to three bits having a value of "1" in the 16-bit bitmap.

When the value of the 2-bit information is 11, which indicates that the number of CSI-RS antenna ports is 16, a CSI-RS may be transmitted through 16 antenna ports in the 16 REs corresponding to four bits having a value of "1" from the 16-bit bitmap.

When the value of the 2-bit information is 11, which indicates that the number of CSI-RS antenna ports is 32, a CSI-RS may be transmitted through 32 antenna ports in the 32 REs corresponding to 8 bits having a value of "1" in the 16-bit bitmap.

In the above described embodiments 1-1, 1-2, 2-1 and 2-2, the embodiment 2-1 has the highest flexibility in association with the setting of the number of CSI-RS antenna ports and the CSI-RS resource allocation, and the flexibility may become lower in order of the embodiment 2-2, 1-1, and 1-2. The embodiment 1-2 has the lowest signaling overhead in association the setting of the number of CSI-RS antenna ports and the CSI-RS resource allocation, and the signaling overhead may become lower in order of the embodiments 1-1, 2-2, and 2-1.

Embodiment 3

The present embodiment relates to a method of supporting more than 32 CSI-RS antenna ports.

In the case of 32 or fewer CSI-RS antenna ports, a CSI-RS may be simultaneously transmitted through 32 or fewer CSI-RS antenna ports using one or more multiplexing schemes out of: a Code Division Multiplexing (CDM) that distinguishes different antenna ports in a single subframe based on different codes (e.g., OCC); a Frequency Division Multiplexing (FDM) that distinguishes different antenna ports based on different sub-carrier locations; and Time Division Multiplexing (TDM) that distinguishes different antenna ports based on different OFDM symbol locations. However, when a CSI-RS is transmitted through more than 32 antenna ports in a single subframe, an overhead of a CSI-RS transmission becomes high, and thus, a CSI-RS may be transmitted using more than one subframe.

For example, when the number of CSI-RS antenna ports is 64, two subframes may be used for a CSI-RS transmission. That is, a CSI-RS may be transmitted through some 32 antenna ports out of the 64 antenna ports in a first subframe, and the CSI-RS may be transmitted through the remaining 32 antenna ports in a second subframe.

Herein, the first subframe may be determined based on the above described subframeConfig parameter or the like, and a first available subframe after the first subframe may be determined as the second subframe. For example, the second subframe may be an immediately subsequent subframe of the first subframe. Alternatively, when a CSI-RS transmission is not allowed in the immediately subsequent subframe of the first subframe, a subsequent subframe thereof, which is available, may be determined as the second subframe.

Also, the resource setting for a CSI-RS-transmission on the 32 antenna ports in the first subframe and the resource setting for the CSI-RS transmission on the 32 antenna ports in the second subframe may be identical to each other. Accordingly, only signaling for the CSI-RS setting associated with the first subframe may be required, and separate signaling for the CSI-RS setting associated with the second subframe may not be required.

To execute signaling the number of antenna ports, which is greater than 32, the set of candidates of the number of CSI-RS antenna ports may be configured in a manner that excludes one element out of {6, 12, 16, 32} and adds one candidate of the number of antenna ports, which corresponds to a value that is greater than 32. For example, the set of the candidates of the number of CSI-RS antenna ports may be configured as {12, 16, 32, 64}, {6, 16, 32, 64}, {6, 12, 32, 64}, or {6, 12, 16, 64}. In this instance, in the method of signaling the number of CSI-RS antenna ports and the method of signaling the CSI-RS resource allocation, which have been described in the embodiment 1 and the embodiment 2, the embodiment associated with a predetermined candidate of the number of antenna ports may be replaced with the embodiment associated with the candidates of the number of antenna ports, which are greater than 32. Accordingly, extra signaling overhead may not be generated when compared to the above described embodiment 1 and the embodiment 2.

Alternatively, to execute signaling the number of antenna ports, which is greater than 32, one candidate of the number of antenna ports, which is greater than 32, may be added to the set {6, 12, 16, 32} of candidates of the number of CSI-RS antenna ports. For example, the set of the candidates of the number of CSI-RS antenna ports may be configured as {6, 12, 16, 32, 64}. In this instance, in the method of signaling the number of CSI-RS antenna ports and the method of signaling the CSI-RS resource allocation, which have been described in the embodiment 1 and the embodiment 2, extra 1-bit signaling may be required to distinguish the case of 32 antenna ports and the case of 64 antenna ports.

Although the above described illustrative methods are expressed as a series of operations for ease of description, they may not limit the order of operations executed, and the operations may be executed in parallel or in a different order. Also, all of the operations described above may not be always required to implement the method of the present invention.

The above described embodiments may include examples of various aspects of the present invention. Although it is difficult to describe all the possible combinations showing the various aspects, it is apparent to those skilled in the art that other combinations are possible. Therefore, it should be construed that the present invention includes other substitutions, corrections, and modifications belonging to the scope of claims.

The scope of the present invention includes an apparatus that processes or implements the operations according to various embodiments of the present invention (e.g., a wireless device and components thereof, which have been described with reference to FIG. 1).

Figure 12:
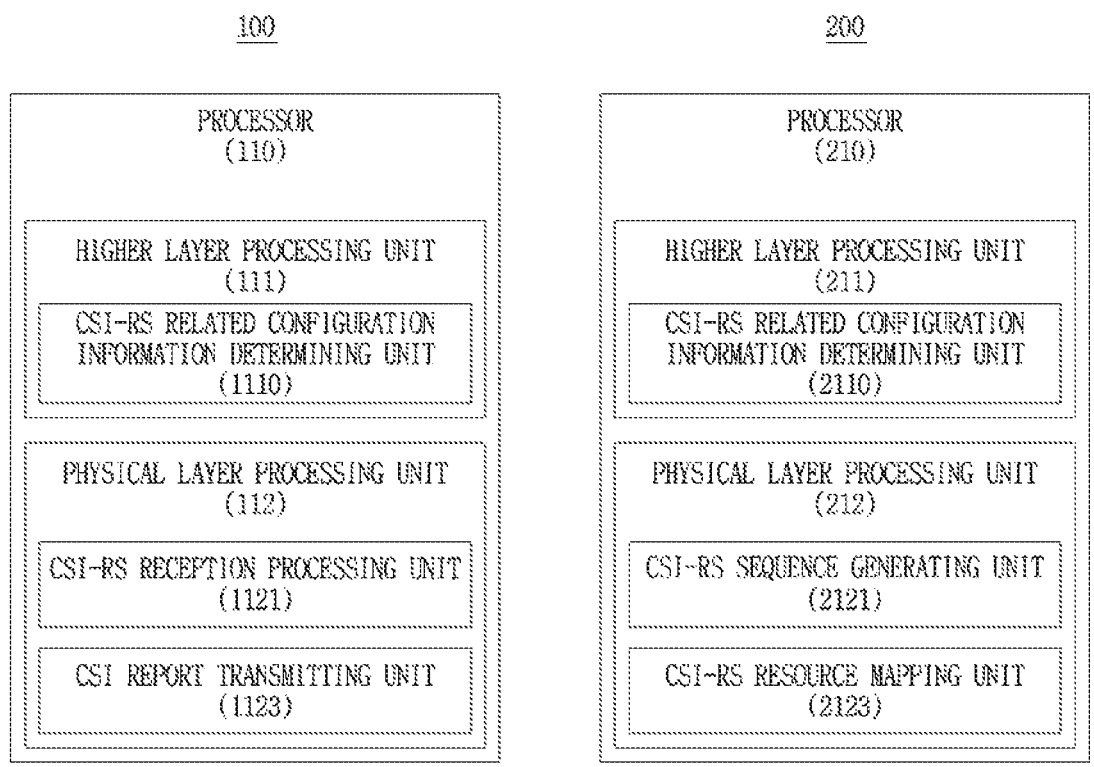
FIG. 12 is a diagram illustrating a configuration of a processor according to an embodiment of the present invention.

FIG. 12 is a diagram illustrating the configuration of a processor according to an embodiment of the present invention.

The higher layer processing unit 111 and the physical layer processing unit 112 of the processor 110 of the UE 100 may perform the operations of receiving and processing a CSI-RS, which supports a new antenna configuration (e.g., more than 8 antenna ports) that takes into consideration the FD-MIMO, as described in various embodiments of the present invention.

The higher layer processing unit 111 may include a CSI-RS related configuration information determining unit 1110. The CSI-RS related configuration information determining unit 1110 may receive CSI-RS related configuration information (e.g., information associated with the number of CSI-RS antenna ports, CSI-RS resource allocation information, a CSI-RS sequence generating parameter, CSI-RS subframe allocation information, CSI-RS transmission power information, and the like) which is provided from the eNB 200 through a higher layer signaling or the like, and may control the UE 100 to properly receive a CSI-RS based on the corresponding information.

Here, the CSI-RS related configuration information may correspond to configuration information for a CSI-RS (e.g., a CSI-RS that uses more than 8 antenna ports), which supports a new antenna configuration that takes into consideration FD-MIMO. The CSI-RS related configuration information determining unit 1110 may configure information associated with the number of CSI-RS antenna ports, by combining information indicating the number of CSI-RS antenna ports in a single group, such as an antennaPortsCount parameter, and additional information (e.g., the number of CSI-RS antenna port groups or the number of CSI-RS resources), and may determine the total number of CSI-RS antenna/ports. Also, the CSI-RS related configuration information determining unit 1110 may determine CSI-RS resource allocation information for each of the CSI-RS antenna port groups. For example, CSI-RS resource allocation information that is signaled as many times as the number of CSI-RS antenna port groups may be used, or CSI-RS resource allocation information that is signaled with respect to a single group may be used to determine resources with respect to the remaining group(s). Here, the CSI-RS related configuration information determining unit 1110 may process the information associated with the number of CSI-RS antenna ports and the CSI-RS resource allocation information as separate signaling information, or may process them as single signaling information in the form of a bitmap.

The physical layer processing unit 112 may include a CSI-RS reception processing unit 1121 and a CSI report transmitting unit 1123. The CSI-RS reception processing unit 1121 may receive a CSI-RS based on the CSI-RS related configuration information which is provided through a higher layer signaling or the like. The CSI report transmitting unit 1123 may generate a CSI based on channel information estimated based on the received CSI-RS, and may transmit the same to the eNB 200.

The higher layer processing unit 111 and the physical layer processing unit 112 of the processor 210 of the eNB 200 may perform the operations of generating and transmitting a CSI-RS, which supports a new antenna configuration (e.g., more than 8 antenna ports) that takes into consideration the FD-MIMO, as described in various embodiments of the present invention.

The higher layer processing unit 211 may include a CSI-RS related configuration information determining unit 2110. The CSI-RS related configuration information determining unit 2110 may determine CSI-RS related configuration information (e.g., information associated with the number of CSI-RS antenna ports, CSI-RS resource allocation information, a CSI-RS sequence generating parameter, CSI-RS subframe allocation information, CSI-RS transmission power information, and the like) which is to be transmitted to the UE 100, and may execute a control to transmit the same to the UE 100 through the physical layer processing unit 212.

Here, the CSI-RS related configuration information may correspond to configuration information for a CSI-RS (e.g., a CSI-RS that uses more than 8 antenna ports), which supports a new antenna configuration that takes into consideration FD-MIMO. The CSI-RS related configuration information determining unit 2110 may provide, as information associated with the number of CSI-RS antenna ports, information indicating the number of CSI-RS antenna ports in a single group, such as an antennaPortsCount parameter, and additional information (e.g., the number of CSI-RS antenna port groups or the number of CSI-RS resources), and thus, may execute signaling the total number of CSI-RS antenna ports to the UE 100. Also, the CSI-RS related configuration information determining unit 2110 may determine CSI-RS resource allocation information for each of the CSI-RS antenna port groups, and may execute signaling them. For example, the CSI-RS related configuration information determining unit 2110 may execute signaling the CSI-RS resource allocation information as many times as the number of CSI-RS antenna port groups, or may execute signaling the CSI-RS resource allocation information with respect to a single group and may enable the UE 100 to determine the resources with respect to the remaining group(s) based on a predetermined association rule. Here, the CSI-RS related configuration information determining unit 2110 may process the information associated with the number of CSI-RS antenna ports and the CSI-RS resource allocation information as separate signaling information, or may process them as single signaling information in the form of a bitmap.

The physical layer processing unit 212 may include a CSI-RS sequence generating unit 2121 and a CSI-RS resource mapping unit 2123. The CSI-RS sequence generating unit 2121 may generate a CSI-RS sequence based on a CSI-RS sequence generating parameter or the like, which is determined in a higher layer. The CSI-RS resource mapping unit 2123 may map the generated CSI-RS sequence to an RE that is determined based on CSI-RS resource allocation information, subframe allocation information, and the like, and may transmit, to the UE 100, a CSI-RS that is mapped to a resource.

The operations of the above described processor 110 of the UE 100 or the processor 210 of the eNB 200 may implemented by software processing or hardware processing, or may be implemented by software and hardware processing. The scope of the present invention may include software (or an operating system, applications, firmware, programs, or the like) that enables the operations according to various embodiments of the present disclosure to be executed in an apparatus or a computer, and a medium that stores such software and is executable in an apparatus or a computer.

According, to an exemplary embodiment, a base station transmits, to a UE, information indicating M CSI-RS antenna ports and resource allocation information of CSI-RS resource configured by aggregating K groups. M and K are integers greater than or equal to 2, respectively. The base station maps CSI-RSs corresponding to the M CSI-RS antenna ports on the CSI-RS resource, and transmits, to the UE, the mapped CSI-RSs.

According to an exemplary embodiment, a UE receives, from a base station, information indicating M CSI-Reference Signal (RS) antenna ports and resource allocation information of CSI-RS resource configured by aggregating K groups. M and K are integers greater than or equal to 2, respectively. The UE receives, from the base station, CSI-RSs corresponding to the M CSI-RS antenna ports mapped on the CSI-RS resource, and transmits, to the base station, the CSI generated based on the CSI-RS.

According to an exemplary embodiment, a base station includes a processor and a transceiver. The processor may include a CSI-RS configuration information determining unit to generate information indicating M CSI-RS antenna ports and resource allocation information of CSI-RS resource configured by aggregating K groups, and a CSI-RS resource mapping unit to map CSI-RSs corresponding to the M CSI-RS antenna ports on the CSI-RS resource. M and K are integers greater than or equal to 2, respectively. The processor is configured to transmit, to the UE, the mapped CSI-RSs using the transceiver.

According, to an exemplary embodiment, a UE includes a processor and a transceiver. The processor may include a a CSI-Reference Signal (RS) configuration information determining unit to determine, based on a signaling from a base station, information indicating M CSI-Reference Signal (RS) antenna ports and resource allocation information of CSI-RS resource configured by aggregating K groups, and a CSI-RS processing unit to process CSI-RSs corresponding to the M CSI-RS antenna ports on the CSI-RS resource; and a CSI report transmitting unit to transmit, to the base station, the CSI generated based on the CSI-RSs. M and K are integers greater than or equal to 2, respectively.

The CSI-RS resource configured by aggregating the K groups may be defined in one subframe. Further, M is greater than 8 in certain configuration when K is greater than 1. When K is equal to 2, the CSI-RS resource is configured by aggregating CSI-RS resource of group 1 and CSI-RS resource of group 2, and resource allocation information of CSI-RS resource of the group 1 and resource allocation information of CSI-RS resource of the group 2 may be separately signaled.

According, to an exemplary embodiment, the CSI-RS resource of the group 1 corresponds to a part of the M antenna ports, and the CSI-RS resource of the group 2 corresponds to the remaining of the M antenna ports. Further, the number of antenna ports corresponds to the CSI-RS resource of the group 1 may be equal to the number of antenna ports corresponds to the CSI-RS resource of the group 2.

According to an exemplary embodiment, when M is equal to 16, 8 antenna ports correspond to the CSI-RS resource of the group 1 and the remaining 8 antenna ports correspond to the CSI-RS resource of the group 2.

The information indicating the M CSI-RS antenna ports may be an aggregation of information indicating the K groups and information indicating a number of antennas in each group. The resource allocation information of the CSI-RS resource may be proportional to K.

Although the various embodiments of the present invention have been described from the perspective of the 3GPP LTE or LTE-A system, they may be applied to various mobile communication systems.

What is claimed is:

1. A base station for transmitting Channel State Information Reference Signal (CSI-RS) in a wireless network, the base station comprising:
   one or more memories; and
   one or more processors coupled to the one or more memories, the one or more processors configured to cause:
   generating a first information representing a number of antenna ports;
   generating a second information representing a CSI-RS resource allocation, wherein the CSI-RS resource allocation includes a CSI-RS configuration indicating a location of a CSI-RS resource;
   when a total number of antenna ports used for transmission of CSI-RS is greater than a maximum number of antenna ports which the first information is able to represent, generating a third information representing one or more additional CSI-RS resource allocations, wherein each of one or more additional CSI-RS resource allocations includes a corresponding CSI-RS configuration indicating a location of a corresponding CSI-RS resource, and
   transmitting, to a User Equipment (UE), the first information, the second information, and the third information without explicitly signaling the total number of antenna ports used for transmission of CSI-RS and without explicitly signaling a total number of CSI-RS resources;
   wherein the total number of antenna ports used for transmission of the CSI-RS is obtained based on the number of antenna ports represented by the first information and the total number of CSI-RS resources indicated by the second information and the third information, and wherein the maximum number of antenna ports which the first information is able to represent is 8, and if the total number of antenna ports used for transmission of CSI-RS is 16, the number of antenna ports represented by the first information is 8 and the total number of the CSI-RS resources indicated by the second information and the third information is 2.

2. The base station of claim 1, wherein if the total number of antenna ports used for transmission of CSI-RS is 32, the number of antenna ports represented by the first information is 8 and the total number of the CSI-RS resources indicated by the second information and the third information is 4.

3. The base station of claim 1, wherein the total number of CSI-RS resources is the same as a number of CSI-RS resource allocations included in the second information and the third information.

4. The base station of claim 1, wherein the total number of CSI-RS resource is implicitly indicated by the second information and the third information.

5. The base station of claim 1, wherein a number of antenna ports corresponding to a first CSI-RS configuration among CSI-RS configurations indicated by the second information and the third information is an integer multiple of a number of antenna ports corresponding to a second CSI-RS configuration among CSI-RS configurations indicated by the second information and the third information.

6. The base station of claim 5, wherein the number of antenna ports corresponding to the first CSI-RS configuration doubles the number of antenna ports corresponding to the second CSI-RS configuration.

7. A user equipment for communicating with a base station in a wireless network, the user equipment comprising:
one or more memories; and
one or more processors coupled to the one or more memories, the one or more processors configured to cause:
receiving, from the base station, a first information representing a number of antenna ports and a second information representing a Channel State Information Reference Signal (CSI-RS) resource allocation, wherein the CSI-RS resource allocation includes a CSI-RS configuration indicating a location of a CSI-RS resource;
receiving, from the base station, a third information representing one or more additional CSI-RS resource allocations if a total number of antenna ports used for transmission of CSI-RS is greater than a maximum number of antenna ports which the first information is able to represent, wherein each of one or more additional CSI-RS resource allocations includes a corresponding CSI-RS configuration indicating a location of a corresponding CSI-RS resource;
receiving, from the base station, CSI-RS including a reference sequence through CSI-RS resources;
obtaining the total number of antenna ports used for transmission of CSI-RS based on the first information, the second information and the third information, wherein neither the total number of antenna ports used for transmission of CSI-RS nor the total number of CSI-RS resources is explicitly signaled from the base station; and
communicating with the base station based on the obtained total number of antenna ports used for transmission of CSI-RS.

8. The user equipment of claim 7, wherein the maximum number of antenna ports which the first information is able to represent is 8, and if the total number of antenna ports used for transmission of CSI-RS is 16, the number of antenna ports represented by the first information is 8 and the total number of the CSI-RS resources indicated by the second information and the third information is 2.

9. The user equipment of claim 8, wherein if the total number of antenna ports used for transmission of CSI-RS is 32, the number of antenna ports represented by the first information is 8 and the total number of the CSI-RS resources indicated by the second information and the third information is 4.

10. The user equipment of claim 7, wherein the total number of CSI-RS resources is the same as a number of CSI-RS resource allocations included in the second information and the third information.

11. The user equipment of claim 7, wherein the total number of CSI-RS resource is implicitly indicated by the second information and the third information.

12. The user equipment of claim 7, wherein a number of antenna ports corresponding to a first CSI-RS configuration among CSI-RS configurations indicated by the second information and the third information is an integer multiple of a number of antenna ports corresponding to a second CSI-RS configuration among CSI-RS configurations indicated by the second information and the third information.

13. The user equipment of claim 12, wherein the number of antenna ports corresponding to the first CSI-RS configuration doubles the number of antenna ports corresponding to the second CSI-RS configuration.

* * * * *